(12) United States Patent
Weichbrod et al.

(10) Patent No.: US 9,810,770 B1
(45) Date of Patent: Nov. 7, 2017

(54) EFFICIENT RETRIEVAL OF AVIATION DATA AND WEATHER OVER LOW BANDWIDTH LINKS

(71) Applicants: Shimon Weichbrod, Baltimore, MD (US); David Graves, Seattle, WA (US)

(72) Inventors: Shimon Weichbrod, Baltimore, MD (US); David Graves, Seattle, WA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 641 days.

(21) Appl. No.: 14/323,766

(22) Filed: Jul. 3, 2014

(51) Int. Cl.
*G01S 13/95* (2006.01)
*G01S 7/24* (2006.01)
*G01S 7/10* (2006.01)
*G01S 7/04* (2006.01)

(52) U.S. Cl.
CPC .............. *G01S 7/24* (2013.01); *G01S 13/953* (2013.01); *G01S 7/04* (2013.01); *G01S 7/10* (2013.01); *G01S 13/95* (2013.01)

(58) Field of Classification Search
CPC ... G01S 7/04; G01S 7/24; G01S 7/062; G01S 7/10; G01S 13/95–13/953
USPC .................................. 342/26 R, 26 B, 26 D
See application file for complete search history.

(56) References Cited

U.S. PATENT DOCUMENTS

| 650,275 | A | 5/1900 | Reeve |
| 3,251,057 | A | 5/1966 | Buehler et al. |
| 3,359,557 | A | 12/1967 | Fow et al. |
| 3,404,396 | A | 10/1968 | Buchler et al. |

(Continued)

FOREIGN PATENT DOCUMENTS

| EP | 1 329 738 B1 | 7/2003 |
| FR | 2658617 A1 | 8/1991 |

(Continued)

OTHER PUBLICATIONS

U.S. Appl. No. 12/075,103, filed Mar. 7, 2008, Woodell et al.

(Continued)

*Primary Examiner* — Peter Bythrow
(74) *Attorney, Agent, or Firm* — Donna P. Suchy; Daniel M. Barbieri

(57) ABSTRACT

A method of selectively displaying an image representative of a weather condition in relation to an aircraft includes selecting, on a display screen, a display area to display weather data based on the location of the aircraft, selecting a weather condition to display from among a plurality of weather conditions, determining if any weather conditions are available to be displayed outside the selected display area and if the weather conditions should be displayed outside the selected display area based on the location of the aircraft and the severity of the non-selected weather conditions, receiving, from a weather data source, weather data representative of the selected weather condition with respect to the selected display area, and receiving weather data representative of weather conditions that should be displayed outside the selected display area, the weather data including location data for the weather conditions, and displaying the image representative of the selected weather condition within the selected display area and the weather conditions that should be displayed outside the selected display area, the image based on the received weather data.

25 Claims, 8 Drawing Sheets

(56) References Cited

U.S. PATENT DOCUMENTS

| | | | |
|---|---|---|---|
| 3,465,339 | A | 9/1969 | Marner |
| 3,491,358 | A | 1/1970 | Hicks |
| 3,508,259 | A | 4/1970 | Andrews |
| 3,540,829 | A | 11/1970 | Collinson et al. |
| 3,567,915 | A | 3/1971 | Altshuler et al. |
| 3,646,555 | A | 2/1972 | Atlas |
| 3,715,748 | A | 2/1973 | Hicks |
| 3,764,719 | A | 10/1973 | Dell |
| 3,781,530 | A | 12/1973 | Britland et al. |
| 3,781,878 | A | 12/1973 | Kirkpatrick |
| 3,803,609 | A | 4/1974 | Lewis et al. |
| 3,885,237 | A | 5/1975 | Kirkpatrick |
| 3,943,511 | A | 3/1976 | Evans et al. |
| 3,964,064 | A | 6/1976 | Brandao et al. |
| 3,968,490 | A | 7/1976 | Gostin |
| 4,015,257 | A | 3/1977 | Fetter |
| 4,043,194 | A | 8/1977 | Tanner |
| 4,179,693 | A * | 12/1979 | Evans ............... G01S 7/04 342/64 |
| 4,223,309 | A | 9/1980 | Payne |
| 4,240,108 | A * | 12/1980 | Levy ............... G01S 7/24 340/995.26 |
| 4,283,715 | A | 8/1981 | Choisnet |
| 4,283,725 | A | 8/1981 | Chisholm |
| 4,318,100 | A | 3/1982 | Shimizu et al. |
| 4,346,595 | A | 8/1982 | Frosch et al. |
| 4,430,654 | A | 2/1984 | Kupfer |
| 4,435,707 | A | 3/1984 | Clark |
| 4,459,592 | A | 7/1984 | Long |
| 4,533,915 | A | 8/1985 | Lucchi et al. |
| 4,555,703 | A | 11/1985 | Cantrell |
| 4,600,925 | A | 7/1986 | Alitz et al. |
| 4,613,937 | A | 9/1986 | Batty, Jr. |
| 4,613,938 | A | 9/1986 | Hansen et al. |
| 4,649,388 | A | 3/1987 | Atlas |
| 4,658,255 | A | 4/1987 | Nakamura et al. |
| 4,684,950 | A | 8/1987 | Long |
| 4,742,353 | A | 5/1988 | D'Addio et al. |
| 4,761,650 | A | 8/1988 | Masuda et al. |
| 4,835,536 | A | 5/1989 | Piesinger et al. |
| RE33,152 | E | 1/1990 | Atlas |
| 4,914,444 | A | 4/1990 | Pifer et al. |
| 4,928,131 | A | 5/1990 | Onozawa |
| 4,940,987 | A * | 7/1990 | Frederick ............... G01S 7/24 342/180 |
| 5,036,334 | A | 7/1991 | Henderson et al. |
| 5,049,886 | A | 9/1991 | Seitz et al. |
| 5,057,820 | A | 10/1991 | Markson et al. |
| 5,077,558 | A | 12/1991 | Kuntman |
| 5,105,191 | A | 4/1992 | Keedy |
| 5,159,407 | A | 10/1992 | Churnside et al. |
| 5,164,731 | A | 11/1992 | Borden et al. |
| 5,173,704 | A | 12/1992 | Buehler et al. |
| 5,177,487 | A | 1/1993 | Taylor et al. |
| 5,198,819 | A | 3/1993 | Susnjara |
| 5,202,690 | A | 4/1993 | Frederick |
| 5,208,587 | A | 5/1993 | Cornman |
| 5,208,600 | A | 5/1993 | Rubin |
| 5,221,924 | A | 6/1993 | Wilson, Jr. |
| 5,262,773 | A | 11/1993 | Gordon |
| 5,291,208 | A | 3/1994 | Young |
| 5,296,865 | A | 3/1994 | Lewis |
| 5,311,183 | A | 5/1994 | Mathews et al. |
| 5,311,184 | A | 5/1994 | Kuntman |
| 5,331,330 | A | 7/1994 | Susnjara |
| 5,396,220 | A | 3/1995 | Markson et al. |
| 5,402,116 | A | 3/1995 | Ashley |
| 5,469,168 | A | 11/1995 | Anderson |
| 5,479,173 | A | 12/1995 | Yoshioka et al. |
| 5,485,157 | A | 1/1996 | Long |
| 5,517,193 | A * | 5/1996 | Allison ............... G01W 1/02 342/26 R |
| 5,521,603 | A | 5/1996 | Young |
| 5,534,868 | A | 7/1996 | Gjessing et al. |
| 5,568,151 | A | 10/1996 | Merritt |
| 5,583,972 | A | 12/1996 | Miller |
| 5,592,171 | A | 1/1997 | Jordan |
| 5,602,543 | A | 2/1997 | Prata et al. |
| 5,615,118 | A | 3/1997 | Frank |
| 5,648,782 | A | 7/1997 | Albo et al. |
| 5,654,700 | A | 8/1997 | Prata et al. |
| 5,657,009 | A | 8/1997 | Gordon |
| 5,686,919 | A | 11/1997 | Jordan et al. |
| 5,726,656 | A | 3/1998 | Frankot |
| 5,757,322 | A | 5/1998 | Ray et al. |
| 5,771,020 | A | 6/1998 | Markson et al. |
| 5,828,332 | A | 10/1998 | Frederick |
| 5,831,570 | A | 11/1998 | Ammar et al. |
| 5,838,239 | A | 11/1998 | Stern et al. |
| 5,839,080 | A | 11/1998 | Muller et al. |
| 5,907,568 | A | 5/1999 | Reitan, Jr. |
| 5,920,276 | A | 7/1999 | Frederick |
| 5,936,552 | A * | 8/1999 | Wichgers ............... G01C 23/00 340/961 |
| 5,945,926 | A | 8/1999 | Ammar et al. |
| 5,973,635 | A | 10/1999 | Albo |
| 6,018,307 | A | 1/2000 | Wakayama et al. |
| 6,034,760 | A | 3/2000 | Rees |
| 6,043,756 | A * | 3/2000 | Bateman ............... G01S 7/003 340/945 |
| 6,043,757 | A | 3/2000 | Patrick |
| 6,081,220 | A | 6/2000 | Fujisaka et al. |
| 6,138,060 | A | 10/2000 | Conner et al. |
| 6,154,151 | A | 11/2000 | McElreath et al. |
| 6,154,169 | A | 11/2000 | Kuntman |
| 6,177,873 | B1 | 1/2001 | Cragun |
| 6,184,816 | B1 | 2/2001 | Zheng et al. |
| 6,201,494 | B1 | 3/2001 | Kronfeld |
| 6,208,284 | B1 | 3/2001 | Woodell et al. |
| 6,236,351 | B1 | 5/2001 | Conner et al. |
| 6,240,369 | B1 | 5/2001 | Foust |
| 6,246,367 | B1 | 6/2001 | Markson et al. |
| 6,281,832 | B1 | 8/2001 | McElreath |
| 6,289,277 | B1 | 9/2001 | Feyereisen et al. |
| 6,297,772 | B1 | 10/2001 | Lewis |
| 6,339,747 | B1 * | 1/2002 | Daly ............... G01W 1/10 702/3 |
| 6,340,946 | B1 | 1/2002 | Wolfson et al. |
| 6,377,202 | B1 | 4/2002 | Kropfli et al. |
| 6,381,538 | B1 | 4/2002 | Robinson et al. |
| 6,384,830 | B2 * | 5/2002 | Baron ............... G06T 17/05 345/473 |
| 6,388,607 | B1 | 5/2002 | Woodell |
| 6,388,608 | B1 | 5/2002 | Woodell et al. |
| RE37,725 | E | 6/2002 | Yamada |
| 6,405,134 | B1 | 6/2002 | Smith et al. |
| 6,424,288 | B1 | 7/2002 | Woodell |
| 6,441,773 | B1 * | 8/2002 | Kelly ............... G01S 7/003 340/945 |
| 6,448,922 | B1 * | 9/2002 | Kelly ............... G01S 7/003 342/175 |
| 6,456,226 | B1 | 9/2002 | Zheng et al. |
| 6,480,142 | B1 | 11/2002 | Rubin |
| 6,496,252 | B1 | 12/2002 | Whiteley |
| 6,501,392 | B2 | 12/2002 | Gremmert et al. |
| 6,512,476 | B1 | 1/2003 | Woodell |
| 6,518,914 | B1 | 2/2003 | Peterson et al. |
| 6,549,161 | B1 | 4/2003 | Woodell |
| 6,560,538 | B2 | 5/2003 | Schwinn et al. |
| 6,563,452 | B1 | 5/2003 | Zheng et al. |
| 6,577,947 | B1 * | 6/2003 | Kronfeld ............... G01C 21/00 701/301 |
| 6,590,520 | B1 | 7/2003 | Steele et al. |
| 6,597,305 | B2 | 7/2003 | Szeto et al. |
| 6,603,425 | B1 | 8/2003 | Woodell |
| 6,606,564 | B2 | 8/2003 | Schwinn et al. |
| 6,614,382 | B1 | 9/2003 | Cannaday et al. |
| 6,650,275 | B1 | 11/2003 | Kelly et al. |
| 6,650,972 | B1 * | 11/2003 | Robinson ............... G01C 23/00 701/14 |
| 6,667,710 | B2 | 12/2003 | Cornell et al. |
| 6,670,908 | B2 | 12/2003 | Wilson et al. |
| 6,677,886 | B1 | 1/2004 | Lok |

(56) References Cited

U.S. PATENT DOCUMENTS

| | | | |
|---|---|---|---|
| 6,683,609 B1 | 1/2004 | Baron et al. | |
| 6,690,317 B2 | 2/2004 | Szeto et al. | |
| 6,703,945 B2 | 3/2004 | Kuntman et al. | |
| 6,720,906 B2 | 4/2004 | Szeto et al. | |
| 6,738,010 B2 | 5/2004 | Steele et al. | |
| 6,741,203 B1 | 5/2004 | Woodell | |
| 6,744,382 B1* | 6/2004 | Lapis | G01C 23/005 340/963 |
| 6,771,207 B1 | 8/2004 | Lang | |
| 6,788,043 B2 | 9/2004 | Murphy et al. | |
| 6,791,311 B2 | 9/2004 | Murphy et al. | |
| 6,828,922 B1* | 12/2004 | Gremmert | G01S 7/003 340/949 |
| 6,828,923 B2 | 12/2004 | Anderson | |
| 6,839,018 B2 | 1/2005 | Szeto et al. | |
| 6,850,185 B1 | 2/2005 | Woodell | |
| 6,856,908 B2 | 2/2005 | Devarasetty et al. | |
| 6,879,280 B1 | 4/2005 | Bull et al. | |
| 6,882,302 B1 | 4/2005 | Woodell et al. | |
| 6,917,860 B1* | 7/2005 | Robinson | G01C 23/00 244/1 R |
| 6,977,608 B1 | 12/2005 | Anderson et al. | |
| 7,030,805 B2 | 4/2006 | Ormesher et al. | |
| 7,039,505 B1* | 5/2006 | Southard | G01S 7/003 340/945 |
| 7,042,387 B2* | 5/2006 | Ridenour | G08G 5/0013 342/179 |
| 7,082,382 B1 | 7/2006 | Rose et al. | |
| 7,109,912 B1* | 9/2006 | Paramore | G01S 13/86 342/176 |
| 7,109,913 B1 | 9/2006 | Paramore et al. | |
| 7,116,266 B1 | 10/2006 | Vesel et al. | |
| 7,129,885 B1 | 10/2006 | Woodell et al. | |
| 7,132,974 B1 | 11/2006 | Christianson | |
| 7,139,664 B2 | 11/2006 | Kelly et al. | |
| 7,145,503 B2 | 12/2006 | Abramovich et al. | |
| 7,161,525 B1 | 1/2007 | Finley et al. | |
| 7,200,491 B1 | 4/2007 | Rose et al. | |
| 7,205,928 B1* | 4/2007 | Sweet | G01S 13/953 342/118 |
| 7,242,343 B1 | 7/2007 | Woodell | |
| 7,259,714 B1 | 8/2007 | Cataldo | |
| 7,292,178 B1 | 11/2007 | Woodell et al. | |
| 7,307,576 B1 | 12/2007 | Koenigs | |
| 7,307,577 B1 | 12/2007 | Kronfeld et al. | |
| 7,307,583 B1 | 12/2007 | Woodell et al. | |
| 7,307,586 B2 | 12/2007 | Peshlov et al. | |
| 7,307,756 B2 | 12/2007 | Walmsley | |
| 7,352,317 B1 | 4/2008 | Finley et al. | |
| 7,352,929 B2 | 4/2008 | Hagen et al. | |
| 7,365,674 B2 | 4/2008 | Tillotson et al. | |
| 7,372,394 B1 | 5/2008 | Woodell et al. | |
| 7,383,131 B1 | 6/2008 | Wey et al. | |
| 7,411,519 B1 | 8/2008 | Kuntman et al. | |
| 7,417,578 B1 | 8/2008 | Woodell et al. | |
| 7,417,579 B1 | 8/2008 | Woodell | |
| 7,427,943 B1 | 9/2008 | Kronfeld et al. | |
| 7,436,361 B1 | 10/2008 | Paulsen et al. | |
| 7,471,995 B1* | 12/2008 | Robinson | G01C 23/00 340/901 |
| 7,486,219 B1 | 2/2009 | Woodell et al. | |
| 7,486,220 B1 | 2/2009 | Kronfeld et al. | |
| 7,492,304 B1 | 2/2009 | Woodell et al. | |
| 7,492,305 B1 | 2/2009 | Woodell et al. | |
| 7,515,087 B1 | 4/2009 | Woodell et al. | |
| 7,515,088 B1 | 4/2009 | Woodell et al. | |
| 7,528,613 B1 | 5/2009 | Thompson et al. | |
| 7,541,971 B1 | 6/2009 | Woodell et al. | |
| 7,557,735 B1 | 7/2009 | Woodell et al. | |
| 7,576,680 B1 | 8/2009 | Woodell | |
| 7,581,441 B2 | 9/2009 | Barny et al. | |
| 7,598,901 B2 | 10/2009 | Tillotson et al. | |
| 7,598,902 B1 | 10/2009 | Woodell et al. | |
| 7,633,428 B1 | 12/2009 | McCusker et al. | |
| 7,633,431 B1 | 12/2009 | Wey et al. | |
| 7,656,343 B1* | 2/2010 | Hagen | G01S 13/953 342/26 B |
| 7,664,601 B2 | 2/2010 | Daly, Jr. | |
| 7,696,920 B1 | 4/2010 | Finley et al. | |
| 7,696,921 B1 | 4/2010 | Finley et al. | |
| 7,698,058 B2* | 4/2010 | Chen | G01C 5/005 340/945 |
| 7,714,767 B1 | 5/2010 | Kronfeld et al. | |
| 7,728,758 B2 | 6/2010 | Varadarajan et al. | |
| 7,733,264 B1 | 6/2010 | Woodell et al. | |
| 7,859,448 B1 | 12/2010 | Woodell et al. | |
| 7,868,811 B1 | 1/2011 | Woodell et al. | |
| 7,889,118 B1 | 2/2011 | Finley et al. | |
| 7,917,255 B1 | 3/2011 | Finley | |
| 7,932,853 B1 | 4/2011 | Woodell et al. | |
| 7,973,698 B1 | 7/2011 | Woodell et al. | |
| 7,982,658 B2 | 7/2011 | Kauffman et al. | |
| 8,022,859 B2* | 9/2011 | Bunch | G01S 13/953 342/26 A |
| 8,054,214 B2* | 11/2011 | Bunch | G01S 7/003 342/26 A |
| 8,072,368 B1 | 12/2011 | Woodell | |
| 8,081,106 B2 | 12/2011 | Yannone | |
| 8,089,391 B1 | 1/2012 | Woodell et al. | |
| 8,098,188 B2 | 1/2012 | Costes et al. | |
| 8,098,189 B1 | 1/2012 | Woodell et al. | |
| 8,111,186 B2 | 2/2012 | Bunch et al. | |
| 8,159,369 B1* | 4/2012 | Koenigs | G01S 7/062 340/963 |
| 8,217,828 B2 | 7/2012 | Kirk | |
| 8,228,227 B2* | 7/2012 | Bunch | G01S 7/04 342/180 |
| 8,314,730 B1 | 11/2012 | Musiak et al. | |
| 8,332,084 B1* | 12/2012 | Bailey | G01W 1/10 701/10 |
| 8,902,100 B1 | 12/2014 | Woodell et al. | |
| 9,019,146 B1 | 4/2015 | Finley et al. | |
| 9,507,022 B1 | 11/2016 | Breiholz et al. | |
| 9,535,158 B1 | 1/2017 | Breiholz et al. | |
| 2002/0039072 A1* | 4/2002 | Gremmert | G01S 7/003 340/945 |
| 2002/0126039 A1 | 9/2002 | Dalton et al. | |
| 2003/0001770 A1 | 1/2003 | Cornell et al. | |
| 2003/0025627 A1 | 2/2003 | Wilson et al. | |
| 2003/0117311 A1 | 6/2003 | Funai | |
| 2003/0193411 A1 | 10/2003 | Price | |
| 2004/0183695 A1 | 9/2004 | Ruokangas et al. | |
| 2004/0239550 A1 | 12/2004 | Daly, Jr. | |
| 2005/0049789 A1 | 3/2005 | Kelly et al. | |
| 2005/0174350 A1 | 8/2005 | Ridenour et al. | |
| 2006/0036366 A1 | 2/2006 | Kelly et al. | |
| 2007/0005249 A1 | 1/2007 | Dupree et al. | |
| 2007/0152867 A1 | 7/2007 | Randall | |
| 2008/0040038 A1 | 2/2008 | Southard et al. | |
| 2008/0158049 A1 | 7/2008 | Southard et al. | |
| 2008/0169967 A1* | 7/2008 | Wood | G01S 13/42 342/90 |
| 2008/0180282 A1* | 7/2008 | Brosius | G01C 21/00 340/995.27 |
| 2009/0177343 A1 | 7/2009 | Bunch et al. | |
| 2009/0219197 A1* | 9/2009 | Bunch | G01S 7/003 342/26 B |
| 2010/0019938 A1* | 1/2010 | Bunch | G01S 13/953 340/963 |
| 2010/0019958 A1* | 1/2010 | Bunch | G01S 7/22 342/26 B |
| 2010/0042275 A1* | 2/2010 | Kirk | G01W 1/08 701/14 |
| 2010/0110431 A1 | 5/2010 | Ray et al. | |
| 2010/0194628 A1 | 8/2010 | Christianson et al. | |
| 2010/0201565 A1 | 8/2010 | Khatwa | |
| 2010/0245164 A1 | 9/2010 | Kauffman | |
| 2010/0245165 A1* | 9/2010 | Kauffman | G01S 13/953 342/26 B |
| 2010/0302093 A1* | 12/2010 | Bunch | H04B 7/18506 342/26 B |
| 2010/0302094 A1 | 12/2010 | Bunch et al. | |

(56) References Cited

U.S. PATENT DOCUMENTS

| | | | |
|---|---|---|---|
| 2010/0315265 A1* | 12/2010 | Smith | G01W 1/00 340/963 |
| 2010/0328143 A1* | 12/2010 | Kirk | G01W 1/08 342/26 B |
| 2010/0332056 A1* | 12/2010 | Kirk | G01W 1/04 701/14 |
| 2011/0074624 A1* | 3/2011 | Bunch | G01S 7/003 342/26 D |
| 2011/0148692 A1 | 6/2011 | Christianson | |
| 2011/0148694 A1 | 6/2011 | Bunch et al. | |
| 2012/0029786 A1 | 2/2012 | Calandra et al. | |
| 2012/0086596 A1* | 4/2012 | Insanic | G01S 13/951 342/26 D |
| 2012/0133551 A1 | 5/2012 | Pujol et al. | |
| 2012/0139778 A1* | 6/2012 | Bunch | G01S 13/953 342/26 B |
| 2013/0226452 A1 | 8/2013 | Watts | |
| 2013/0234884 A1 | 9/2013 | Bunch et al. | |
| 2013/0321442 A1* | 12/2013 | Van Os | G09G 5/00 345/582 |
| 2014/0156133 A1* | 6/2014 | Cullinane | B60W 30/00 701/23 |
| 2014/0176362 A1 | 6/2014 | Sneed | |
| 2014/0361923 A1* | 12/2014 | Bunch | G01S 7/062 342/26 B |
| 2014/0362088 A1 | 12/2014 | Veillette et al. | |
| 2015/0310747 A1* | 10/2015 | Frolik | B64D 45/00 340/971 |
| 2016/0180718 A1 | 6/2016 | Shapiro et al. | |
| 2016/0266249 A1* | 9/2016 | Kauffman | G01S 7/003 |

FOREIGN PATENT DOCUMENTS

| | | |
|---|---|---|
| WO | WO-98/07047 A1 | 2/1998 |
| WO | WO-98/22834 A1 | 5/1998 |
| WO | WO-03/005060 A1 | 1/2003 |
| WO | WO-2009/137158 | 11/2009 |

OTHER PUBLICATIONS

U.S. Appl. No. 13/246,769, filed Sep. 27, 2011, Rockwell Collins.
U.S. Appl. No. 13/717,052, filed Dec. 17, 2012, Woodell et al.
U.S. Appl. No. 13/837,538, filed Mar. 15, 2013, Kronfeld et al.
U.S. Appl. No. 13/841,893, filed Mar. 15, 2013, Rockwell Collins, Inc.
U.S. Appl. No. 13/919,406, filed Jun. 17 2013, Rockwell Collins, Inc.
U.S. Appl. No. 14/086,844, filed Nov. 21, 2013, Rockwell Collins, Inc.
U.S. Appl. No. 14/162,035, filed Jan. 23, 2014, Kronfeld et al.
U.S. Appl. No. 14/206,239, filed Mar. 12, 2014, Rockwell Collins.
U.S. Appl. No. 14/206,651, filed Mar. 12, 2014, Rockwell Collins, Inc.
U.S. Appl. No. 14/207,034, filed Mar. 12, 2014, Rockwell Collins, Inc.
U.S. Appl. No. 14/465,730, filed Aug. 21, 2014, Breiholz et al.
U.S. Appl. No. 14/465,753, filed Aug. 21, 2014, Breiholz et al.
U.S. Appl. No. 14/608,071, filed Jan. 28, 2015, Breiholz et al.
3-D Weather Hazard and Avoidance System, Honeywell InteVue Brochure dated Nov. 2008, 4 pages.
Boudevillain et al., 2003, Assessment of Vertically Integrated Liquid (VIL) Water Content Radar Measurement, J. Atmos. Oceanic Technol., 20, 807-819.
Bovith et al., Detecting Weather Radar Clutter by Information Fusion with Satellite Images and Numerical Weather Prediction Model Output; Jul. 31-Aug. 4, 2006, 4 pages.
Burnham et al., Thunderstorm Turbulence and Its Relationship to Weather Radar Echoes, J. Aircraft, Sep.-Oct. 1969, 8 pages.
Corridor Integrated Weather System (CIWS), www.II.mit.edu/mission/aviation/faawxsystems/ciws.html, 3 pages.
Decision on Appeal for Inter Parties Reexamination Control No. 95/001,860, dated Oct. 17, 2014, 17 pages.
Doviak et al., Doppler Radar and Weather Observations, 1984, 298 pages.
Doviak et al., Doppler Radar and Weather Observations, 1984, 298 pages (Uploaded in two parts).
Dupree et al.,FAA Tactical Weather Forecasting in the United States National Airspace, Proceedings from the World Weather Research Symposium on Nowcasting and Very Short Term Forecasts, Toulouse, France, 2005, 29 pages.
Final Office Action on U.S. Appl. No. 12/892,663 dated Mar. 7, 2013, 13 pages.
Final Office Action on U.S. Appl. No. 13/238,606 Dated Apr. 1, 2014, 11 pages.
Final Office Action on U.S. Appl. No. 13/238,606 Dated Jan. 22, 2015, 6 pages.
Final Office Action on U.S. Appl. No. 13/246,769 Dated Sep. 16, 2014, 18 pages.
Goodman et al., LISDAD Lightning Observations during the Feb. 22-23, 1998 Central Florida Tornado Outbreak, http:www.srh.noaa.gov/topics/attach/html/ssd98-37.htm, Jun. 1, 1998, 5 pages.
Greene et al., Vertically Integrated Liquid Water—A New Analysis Tool, Monthly Weather Review, Jul. 1972, 5 pages.
Hodanish, Integration of Lightning Detection Systems in a Modernized National Weather Service Office, http://www.srh.noaa.gov/mlb/hoepub.html, retrieved on Aug. 6, 2007, 5 pages.
Honeywell, RDR-4B Forward Looking Windshear Detection/Weather Radar System User's Manual with Radar Operation Guidelines, Jul. 2003.
Keith, Transport Category Airplane Electronic Display Systems, Jul. 16, 1987, 34 pages.
Klingle-Wilson et al., Description of Corridor Integrated Weather System (CIWS) Weather Products, Aug. 1, 2005, 120 pages.
Kuntman et al, Turbulence Detection and Avoidance System, Flight Safety Foundation 53rd International Air Safety Seminar (IASS), Oct. 29, 2000.
Kuntman, Airborne System to Address Leading Cause of Injuries in Non-Fatal Airline Accidents, ICAO Journal, Mar. 2000.
Kuntman, Satellite Imagery: Predicting Aviation Weather Hazards, ICAO Journal, Mar. 2000, 4 pps.
Lahiff, 2005, Vertically Integrated Liquid Density and Its Associated Hail Size Range Across the Burlington, Vermont County Warning Area, Eastern Regional Technical Attachment, No. 05-01, 20 pages.
Liu, Chuntao et al., Relationships between lightning flash rates and radar reflectivity vertical structures in thunderstorms over the tropics and subtropics, Journal of Geophysical Research, vol. 177, D06212, doi:10.1029/2011JDo17123,2012, American Geophysical Union, 2012, 19 pages.
Meteorological/KSC/L71557/Lighting Detection and Ranging (LDAR), Jan. 2002, 12 pages.
Nathanson, Fred E., "Radar and Its Composite Environment," Radar Design Principles, Signal Processing and the Environment, 1969, 5 pages, McGraw-Hill Book Company, New York et al.
Non-Final Office Action on U.S. Appl. No. 13/238,606 Dated May 27, 2015, 14 pages.
Non-Final Office Action on U.S. Appl. No. 14/452,235 Dated Apr. 23, 2015, 9 pages.
Non-Final Office Action on U.S. Appl. No. 14/681,901 Dated Jun. 17, 2015, 21 pages.
Non-Final Office Action on U.S. Appl. No. 12/892,663 Dated May 29, 2013, 14 pages.
Non-Final Office Action on U.S. Appl. No. 13/238,606 Dated Jul. 8, 2014, 12 pages.
Non-Final Office Action on U.S. Appl. No. 13/238,606 Dated Mar. 27, 2015, 21 pages.
Non-Final Office Action on U.S. Appl. No. 13/238,606 Dated Sep. 23, 2013, 15 pages.
Non-Final Office Action on U.S. Appl. No. 13/717,052 Dated Feb. 11, 2015, 15 pages.
Non-Final Office Action on U.S. Appl. No. 13/717,052 Dated Sep. 9, 2014, 8 pages.

(56) References Cited

OTHER PUBLICATIONS

Non-Final Office Action on U.S. Appl. No. 13/841,893 Dated Jun. 22, 2015, 27 pages.
Non-Final Office Action on U.S. Appl. No. 13/913,100 Dated May 4, 2015, 25 pages.
Non-Final Office Action on U.S. Appl. No. 13/919,406 Dated Jul. 14, 2015, 23 pages.
Non-Final Office Action on U.S. Appl. No. 14/162,035, dated Feb. 4, 2016, 9 pages.
Non-Final Office Action on U.S. Appl. No. 14/086,844, dated Nov. 10, 2015, 17 pages.
Notice of Allowance on U.S. Appl. No. 12/075,103 Dated Aug. 4, 2014, 10 pages.
Notice of Allowance on U.S. Appl. No. 13/246,769 Dated Jan. 8, 2015, 10 pages.
Notice of Allowance on U.S. Appl. No. 13/707,438 Dated Feb. 25, 2015, 11 pages.
Notice of Allowance on U.S. Appl. No. 14/681,901, dated Dec. 23, 2015, 8 pages.
Office Action for U.S. Appl. No. 12/892,663, mail date Oct. 22, 2012, 12 pages.
Office Action for U.S. Appl. No. 13/717,052, mail date Aug. 22, 2013, 15 pages.
Office Action on U.S. Appl. No. 12/075,103 Dated Jul. 31, 2013, 8 pages.
Office Action on U.S. Appl. No. 13/246,769 Dated Apr. 21, 2014, 18 pages.
Pessi et al., On the Relationship Between Lightning and Convective Rainfall Over the Central Pacific Ocean, date unknown, 9 pages.
Robinson et al., En Route Weather Depiction Benefits of the Nexrad Vertically Integrated Liquid Water Product Utilized by the Corridor Integrated Weather System, 10th Conference on Aviation, Range, and Aerospace Meteorology (ARAM), 2002, 4 pages.
Stormscope Lightning Detection Systems, L3 Avionics Systems, retrieved on Jul. 11, 2011, 6 pages.
TOA Technology, printed from website: http://www.toasystems.com/technology.html on Dec. 29, 2010, 2 pages.
Triangulation, from Wikipedia, printed from website: http://en.wikipedia.org/wiki/Triangulation on Dec. 29, 2010, 6 pages.
Waldvogel et al., The Kinetic Energy of Hailfalls. Part I: Hailstone Spectra, Journal of Applied Meteorology, Apr. 1978, 8 pages.
Wilson et al., The Complementary Use of Titan-Derived Radar and Total Lightning Thunderstorm Cells, paper presented on Oct. 16, 2005, 10 pages.
Zipser, Edward J. et al., The Vertical Profile of Radar Reflectivity of Convective Cells: A Strong Indicator of Storm Intensity and Lightning Probability?, American Meteorological Society, Aug. 1994, 9 pages.
Non-Final Office Action on U.S. Appl. No. 14/465,753, dated Apr. 4, 2016, 12 pages.
Notice of Allowance on U.S. Appl. No. 14/086,844, dated Jun. 22, 2016, 8 pages.
Final Office Action on U.S. Appl. No. 13/717,052, dated Nov. 13, 2015, 10 pages.
Final Office Action on U.S. Appl. No. 14/207,034, dated Oct. 13, 2016, 15 pages.
Non-Final Office Action on U.S. Appl. No. 14/162,035 dated Jul. 11, 2016, 10 pages.
Non-Final Office Action on U.S. Appl. No. 14/206,239 dated Jun. 16, 2016, 12 pages.
Non-Final Office Action on U.S. Appl. No. 14/206,651 dated Jun. 23, 2016, 12 pages.
Non-Final Office Action on U.S. Appl. No. 14/207,034 dated Jun. 23, 2016, 14 pages.
Non-Final Office Action on U.S. Appl. No. 14/465,730, dated Oct. 21, 2016, 6 pages.
Non-Final Office Action on U.S. Appl. No. 14/608,071, dated Jan. 23, 2017, 15 pages.
Non-Final Office Action on U.S. Appl. No. 15/137,645 dated Aug. 8, 2016, 6 pages.
Notice of Allowance on U.S. Appl. No. 14/162,035, dated Nov. 9, 2016, 7 pages.
Notice of Allowance on U.S. Appl. No. 14/465,730, dated Feb. 28, 2017, 5 pages.
Notice of Allowance on U.S. Appl. No. 14/465,753, dated Aug. 29, 2016, 8 pages.
Notice of Allowance on U.S. Appl. No. 15/287,673, dated Nov. 18, 2016, 8 pages.
Notice of Allowance on U.S. Appl. No. 14/608,071, dated Aug. 31, 2017, 9 pages.

* cited by examiner

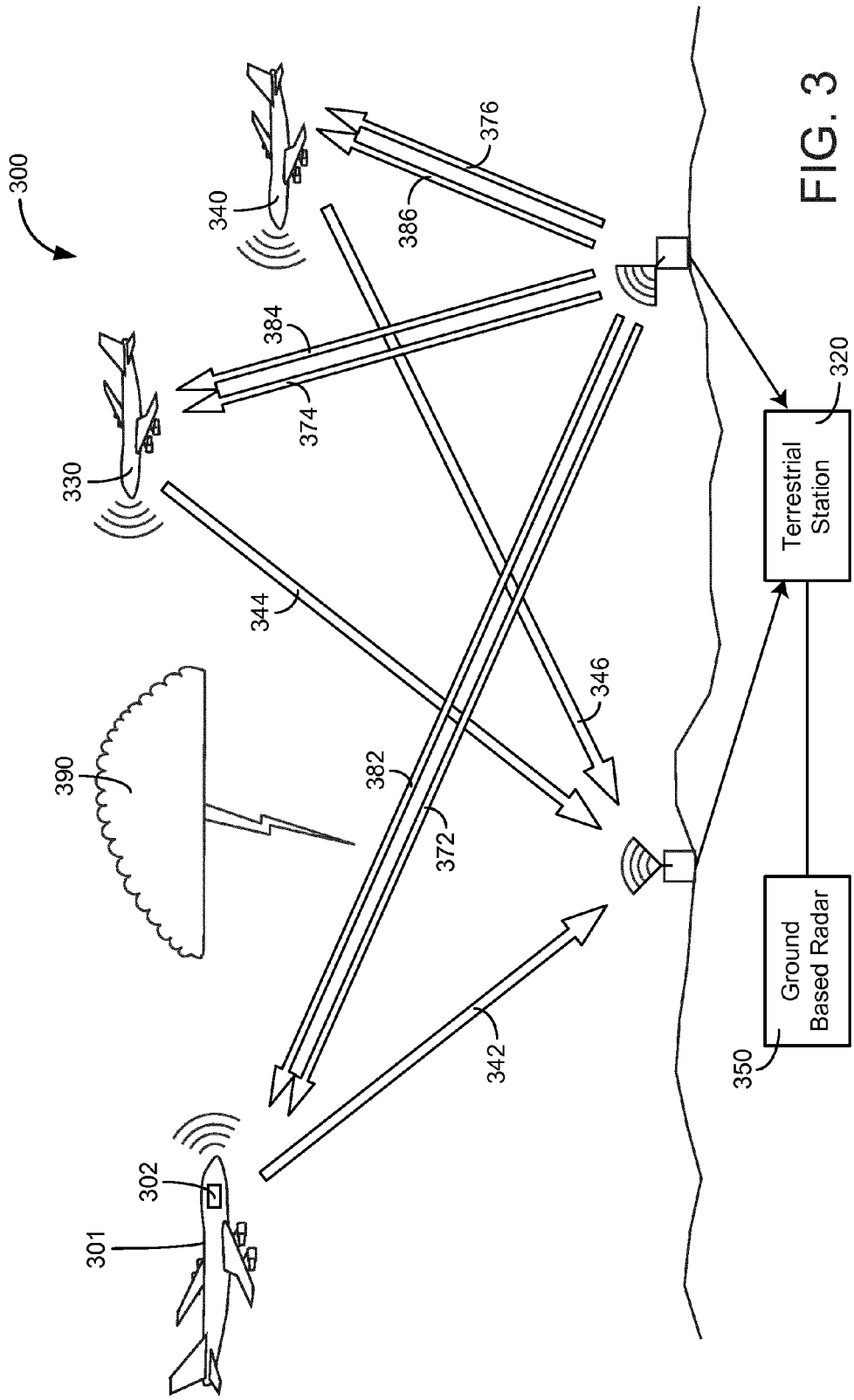

EFFICIENT RETRIEVAL OF AVIATION DATA AND WEATHER OVER LOW BANDWIDTH LINKS

BACKGROUND

The present disclosure relates generally to the field of navigation display systems. More particularly, the present invention relates to a display system and method configured to optimize data sent over low bandwidth links to provide improved communications and display systems in aircrafts.

Displays are utilized in a wide variety of applications including but not limited to medical, military, avionic, entertainment and computing applications. In one exemplary application, displays are used in avionics to provide operators of vehicles, such as pilots or navigators, of information relating to weather and other aviation events. In some aircraft applications, instead of or in addition to analog dials and gauges, display screens provide the pilot with information about the situation of the aircraft, such as altitude, speed, and directional headings. Displays may also provide the pilot with navigation information, such as weather, no-fly zones, or other aviation events, as well as communication data between other aircraft, airports, or other ground-based systems.

Many aircraft have on-board instruments that gather information to be displayed in the cockpit, such as weather radar systems. Such weather radar systems typically include an antenna, a receiver transmitter, a processor, and a display. The system transmits radar pulses and receives radar return signals indicative of weather conditions. Conventional weather radar systems, such as the WXR 2100 MULTI-SCAN radar system manufactured by Rockwell Collins, Inc., have Doppler capabilities and are capable of detecting parameters such as weather range, weather reflectivity, weather velocity, and weather spectral width or velocity variation. Weather radar systems may also detect outside air temperature, winds at altitude, INS G loads (in-situ turbulence), barometric pressure, humidity, etc.

Weather radar signals are processed to provide graphical images to a radar display. The radar display is typically a color display providing graphical images in color to represent the severity of the weather. Some aircraft systems also include other hazard warning systems such as a turbulence detection system. The turbulence detection system can provide indications of the presence of turbulence or other hazards. Conventional weather display systems are configured to display weather data in two dimensions and often operate according to ARINC 453 and 708 standards. A horizontal plan view provides an overview of weather patterns that may affect an aircraft mapped onto a horizontal plane. Generally the horizontal plan view provides images of weather conditions in the vicinity of the aircraft, such as indications of precipitation rates. Red, yellow, and green colors are typically used to symbolize areas of respective precipitation rates, and black color symbolizes areas of very little or no precipitation. Each color is associated with radar reflectivity range which corresponds to a respective precipitation rate range. Red indicates the highest rates of precipitation while green represents the lowest (non-zero) rates of precipitation. Certain displays may also utilize a magenta color to indicate regions of turbulence.

While aircraft-based weather radar systems may typically provide the most timely and directly relevant weather information to the aircraft crew based on scan time of a few seconds, their performance may be limited in several ways. First, typical radar beam widths are 3 to 10 degrees. Additionally, the range of aircraft-based weather radar systems is typically limited to about 300 nautical miles, and typically most effective within about 80-100 nautical miles. Further, aircraft-based weather radar systems may be subject to ground clutter when the radar beam intersects with terrain, or to path attenuation due to intense precipitation or rainfall.

Information provided by aircraft weather radar systems may be used in conjunction with weather information from other aircraft or ground-based systems to, for example, improve range and accuracy and to reduce gaps in radar coverage. For example, the National Weather Service WSR-88D Next Generation Radar (NEXRAD) weather radar system is conventionally used for detection and warning of severe weather conditions in the United States. NEXRAD data is typically more complete than data from aircraft-based weather radar systems due to its use of volume scans of up to 14 different elevation angles with a one degree beam width. Similarly, the National Lightning Detection Network (NLDN) may typically be a reliable source of information for weather conditions exhibiting intense convection. Weather satellite systems, such as the Geostationary Operational Environmental Satellite system (GOES) and Polar Operational Environmental Satellite system (POES) are also primary sources of data used for weather analyses and forecasts.

Providing weather radar information from ground-based systems to aircraft-based systems may increase the range and accuracy of aircraft-based systems in certain conditions. A key issue with aircrafts collecting radar data from ground-based systems relates to image quality. For example, due to the limited bandwidth and throughput over systems such as ACARS, manufacturers often inhibit the amount of information provided to cockpits in an effort to simplify data transmission size and reduce computational complexity. In some instances, cockpit graphics manufacturers impose limitations on image quality, for example, by removing pertinent information from images, by displaying weather patterns larger than actual size to show more detail, or by over compressing images prior to transmission. Also, to reduce the size of transmitted images, color pallets used to depict weather patterns are often reduced from as many as forty-eight colors to as few as four colors. Coverage regions may also be predefined such that the user must select and receive data in regions with little or no relevance to the intended flight path. Similarly, coverage areas may also be limited such that some products are not available in certain regions.

Such image quality issues are further compounded by the types of graphics transmitted to aircraft from ground-based systems. Current systems typically employ graphic format types that require little computer processing capabilities, such as raster scan graphics. Most modern computer displays employ raster graphics in which each on-screen pixel directly corresponds to data stored in memory. The display is refreshed by scanning through pixels and determining an appropriate color for each individual pixel according to the stored data. Raster graphic images include images stored in common file types such as GIF, JPEG/JIFF, JPEG 2000, PNG, Exif, TIFF, RAW, and BMP, among others. One drawback of raster graphics is that image file size directly correlates to the number of pixels in an image and the image's color depth. Accordingly, some current image transmission and display systems reduce file sizes and image quality by limiting the number of colors used or compressing images before transmission. As opposed to raster graphics, vector image formats contain a geometric description which can be rendered smoothly at different desired display sizes. Instead of defining the color of each pixel on a display, vector image formats define images based on vectors that are led through control points. For example, a vector image may be defined as a series of instructions to draw images by defining the position and arrangement of control points that are connected by lines or shapes that, when combined together, define an image. Benefits of storing images in vector format can include smaller file sizes than raster image files, an ability to scale vector images to almost any size without a reduction in quality, and the ability to transmit additional information (e.g., metadata) in the image file.

Current aircraft-based systems typically provide weather displays with limited information that often require the aircraft crew to form mental images of actual weather or other aviation events rather than actually viewing an accurate image. There is an ongoing need for improved weather radar display systems and methods that display weather conditions and other aviation events using improved graphics. There is yet further need for improved weather radar display systems and methods that display weather conditions and other aviation events in selected regions relevant to the aircraft. There is further need for improved weather radar display systems and methods that provide flight crew with varying levels of display options.

SUMMARY

An exemplary embodiment relates to a method of selectively displaying an image representative of a weather condition in relation to an aircraft. The method includes selecting, on a display screen, a display area to display weather data based on the location of the aircraft, selecting a weather condition to display from among a plurality of weather conditions, determining if any weather conditions are available to be displayed outside the selected display area and if the weather conditions should be displayed outside the selected display area based on the location of the aircraft and the severity of the non-selected weather conditions, receiving, from a weather data source, weather data representative of the selected weather condition with respect to the selected display area, and receiving weather data representative of weather conditions that should be displayed outside the selected display area, the weather data including location data for the weather conditions, and displaying the image representative of the selected weather condition within the selected display area and the weather conditions that should be displayed outside the selected display area, the image based on the received weather data.

Another exemplary embodiment relates to an aircraft weather radar system that includes a processor, a display, and memory. The memory contains program instructions that, when executed, cause the processor to select a display area to display weather data based on the location of an aircraft, select a weather condition to display within the selected display area from among a plurality of weather conditions, determine if any weather conditions are available to be displayed outside the selected display area and if the weather conditions should be displayed outside the selected display area based on the location of the aircraft and the severity of the weather conditions, receive, from a weather data source, weather data representative of the selected weather condition with respect to the selected display area and weather data representative of weather conditions that should be displayed outside the selected display area, the weather data including location data for the weather conditions, and display an image representative of the selected weather condition within the selected display area and the weather conditions that should be displayed outside the selected display area, the image based on the received weather data.

Another exemplary embodiment relates to an aircraft weather radar system that includes a processor, a display, and memory. The memory contains program instructions that, when executed, cause the processor to transmit to a weather data source a selected display area to display weather products, the weather products selected from a plurality of available weather products, receive weather data from the weather data source, including weather data representative of the selected weather products with respect to the selected display area, and weather data representative of weather products available outside the selected display area, the weather data including location data for the weather products, and display the selected weather products in the selected display area and the weather products available outside the selected display area, wherein the selected display area is separately identified from the area outside the selected display area, and wherein the selected display area automatically and simultaneously changes location based on the movement of the aircraft.

BRIEF DESCRIPTION OF THE DRAWINGS

The disclosure will become more fully understood from the following detailed description, taken in conjunction with the accompanying drawings, wherein like reference numerals refer to like elements, in which:

FIG. 3 is a diagram of an exemplary aircraft communications system;

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting. As discussed below, the systems and methods can be utilized in a number of display devices for various types of applications or sensing systems. In some embodiments, the systems and methods of the present disclosure may be used for a flight display of an aircraft. According to various other exemplary embodiments, the systems and methods of the present disclosure may be used by any system in any other embodiment for rendering computer graphics and displaying an output (e.g., in another aircraft or spacecraft, a ground-based vehicle, or in a non-vehicle application such as a ground-based weather radar system.

Figure 1A:
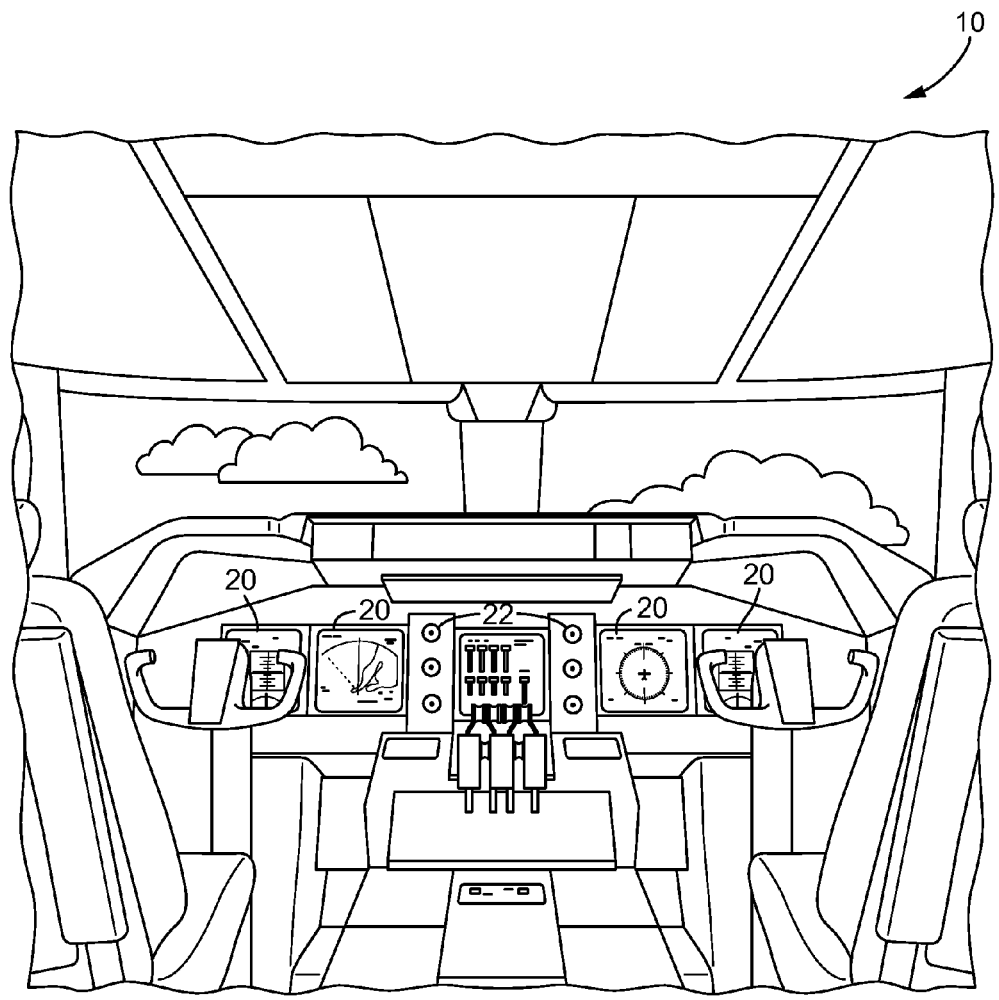
FIG. 1A is a perspective view schematic of an exemplary aircraft control center or cockpit.

Referring to FIG. 1A, an exemplary aircraft control center or cockpit 10 for an aircraft is shown. Aircraft control center 10 may include one or more flight displays 20. Flight displays 20 may be implemented using any of a variety of display technologies, including CRT, LCD, organic LED, dot matrix display, and others. Flight displays 20 may be navigation (NAV) displays, primary flight displays, electronic flight bag displays, tablets such as iPad® computers manufactured by Apple, Inc. or tablet computers, synthetic vision system displays, head up displays (HUDs) with or without a projector, wearable displays, Google glasses, etc. Flight displays 20 may be used to provide information to the flight crew, thereby increasing visual range and enhancing decision-making abilities. One or more flight displays 20 may be configured to function as, for example, a primary flight display (PFD) used to display altitude, airspeed, vertical speed, and navigation and traffic collision avoidance system (TCAS) advisories. One or more flight displays 20 may also be configured to function as, for example, a multi-function display used to display navigation maps, weather radar, electronic charts, TCAS traffic, aircraft maintenance data and electronic checklists, manuals, and procedures. One or more flight displays 20 may also be configured to function as, for example, an engine indicating and crew-alerting system (EICAS) display used to display critical engine and system status data. Other types and functions of flight displays 20 are contemplated as well. According to various exemplary embodiments, at least one of flight displays 20 may be configured to provide a rendered display from the systems and methods of the present disclosure.

In some embodiments, flight displays 20 may provide an output from a ground-based weather radar system. In some embodiments, flight displays 20 may provide an output from an aircraft-based weather radar system, LIDAR system, infrared system or other system on the aircraft. For example, flight displays 20 may include a weather display, a joint display, a weather radar map and a terrain display. Further, flight displays 20 may include an electronic display or a synthetic vision system (SVS). For example, flight displays 20 may include a display configured to display a two-dimensional (2-D) image, a three dimensional (3-D) perspective image of terrain and/or weather information, or a four dimensional (4-D) display of weather information or forecast information. Other views of terrain and/or weather information may also be provided (e.g., plan view, horizontal view, vertical view, etc.). The views may include monochrome or color graphical representations of the terrain and/or weather information. Graphical representations of weather or terrain may include an indication of altitude of the weather or terrain or the altitude relative to the aircraft.

Aircraft control center 10 may include one or more user interface (UI) elements 22. UI elements 22 may include, for example, dials, switches, buttons, touch screens, keyboards, a mouse, joysticks, cursor control devices (CCDs) or other multi-function key pads certified for use with avionics systems, etc. UI elements 22 may be configured to, for example, allow an aircraft crew member to interact with various avionics applications and perform functions such as data entry, manipulation of navigation maps, and moving among and selecting checklist items. For example, UI elements 22 may be used to adjust features of flight displays 20, such as contrast, brightness, width, and length. UI elements 22 may also (or alternatively) be used by an occupant to interface with or change the displays of flight displays 20. UI elements 22 may additionally be used to acknowledge or dismiss an indicator provided by flight displays 20. Further, UI elements 22 may be used to correct errors on the electronic display. Other UI elements 22, such as indicator lights, displays, display elements, and audio alerting devices, may be configured to warn of potentially threatening conditions such as severe weather, terrain, obstacles, etc.

Figure 1B:
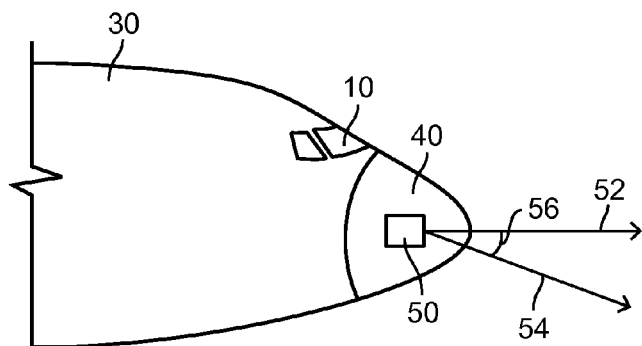
FIG. 1B is a side view schematic illustration of the front of an exemplary aircraft with an aircraft control center and nose.

Referring to FIG. 1B, a side-view of an exemplary aircraft 30 with aircraft control center 10 and a nose 40 is shown. In the illustrated embodiment, a radar system 50, such as a weather radar system or other radar system, is generally located inside nose 40 of aircraft 30 or inside a cockpit of aircraft 30. According to other exemplary embodiments, radar system 50 may be located anywhere on aircraft 30, such as on the top of aircraft 30 or on the tail of aircraft 30. Furthermore, the various components of radar system 50 may be distributed at multiple locations throughout aircraft 30. Additionally, radar system 50 may include or be coupled to an antenna system of aircraft 30. Radar system 50 or other equipment aboard aircraft 30 may also be configured to receive weather data from other sources, for example, from ground-based weather radar systems. Radar system 50 may be any radar system configured to detect or receive data for the systems and methods of the present disclosure. According to exemplary embodiments, radar system 50 may be an RTA-4218 MULTISCAN radar system, a WXR-2100 MULTISCAN radar system, or similar system manufactured by Rockwell Collins and configured in accordance with the principles described herein.

Radar system 50 may generally work by sweeping a radar beam horizontally back and forth across the sky. For example, radar system 50 may conduct a first horizontal sweep 52 directly in front of the aircraft and a second horizontal sweep 54 downward at a tilt angle 56 (e.g., 20 degrees down). Returns from different tilt angles may be electronically merged to form a composite image for display on an electronic display, such as a flight display 20 in aircraft control center 10. Returns may also be processed to, for example, distinguish among terrain, weather, and other objects, to determine the height of the terrain, to determine the height of the weather, etc.

Radar system 50 may also sweep a radar beam vertically back and forth. Results from the different vertical tilt angles may be analyzed to determine the characteristics of weather. For example, the altitude, range, and vertical height of weather may be determined using the vertical scan results. These results may be used to form an image for display on an electronic display (e.g., flight display 20, etc.). For example, a vertical profile view of the weather may be generated. The profile may be used by a pilot to determine height, range, hazards and threats, and other relevant information that may be utilized by an aircraft crew member to change the course of the aircraft to avoid the detected weather condition.

Figure 2:
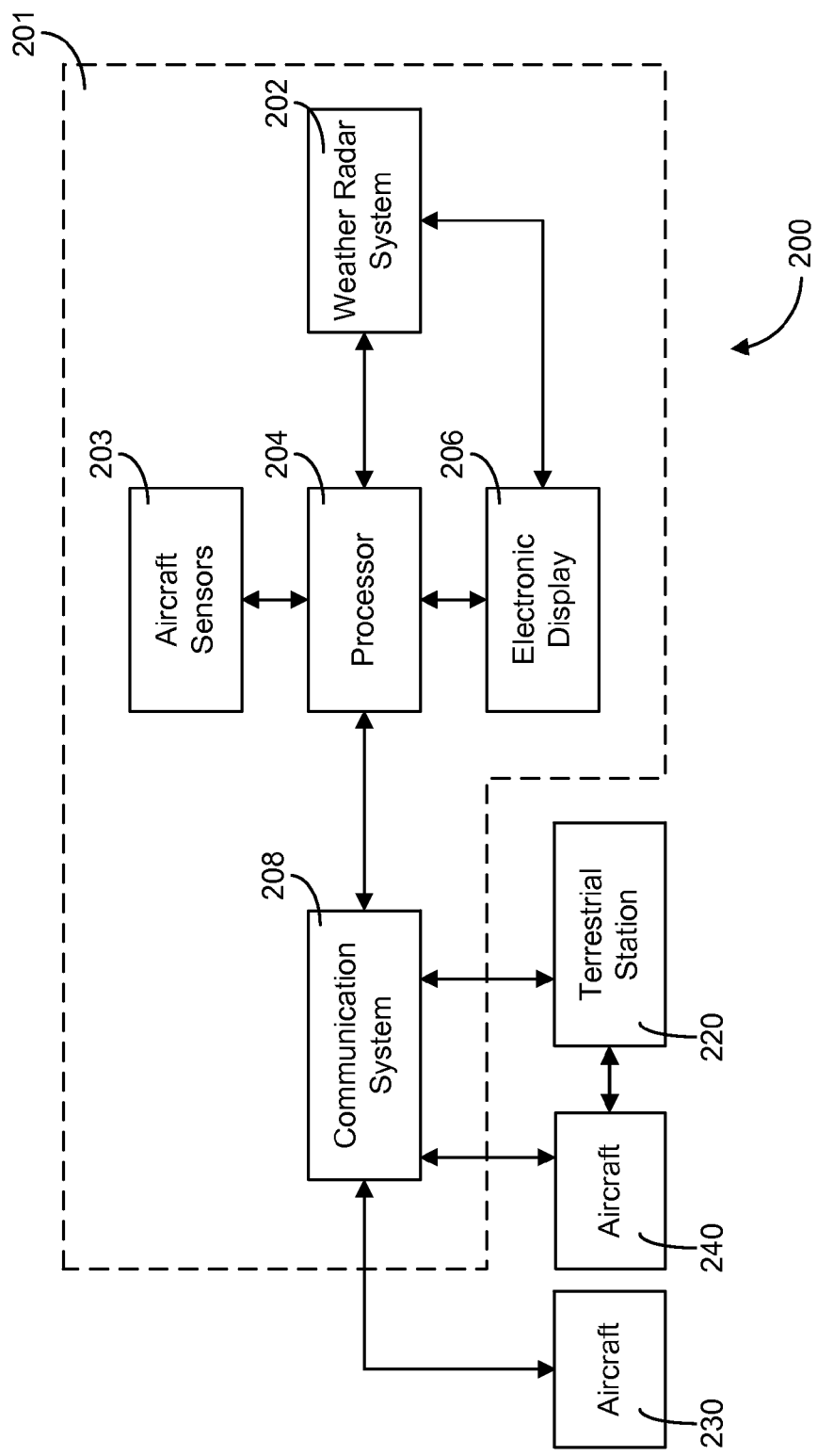
FIG. 2 is a more detailed block diagram of the exemplary weather radar system of FIG. 1.

Referring to FIG. 2, a block diagram of an exemplary weather display system 200 that may be used, for example, on an aircraft 201 or other vehicle is shown. System 200 may include a weather radar system 202 (e.g., a system similar to radar system 50), aircraft sensors 203, electronics (such as a processor 204), an electronic display system 206 (e.g., a display similar to flight display 20, etc.), and a communication system 208. Weather radar system 202 is generally configured to cast one or more radar beams from an aircraft mounted antenna, to receive returns, and to interpret the returns (e.g. for display to a user, for transmission to an external weather system, etc.). In some embodiments, weather radar system 202 is configured to receive weather data from ground-based radar systems.

Additionally, weather radar system 202 may perform multiple radar sweeps. The radar sweeps may include horizontal sweeps, vertical sweeps, or a combination of horizontal and vertical sweeps. Furthermore, the radar sweeps can be performed such that they are substantially orthogonal to one another. According to other exemplary embodiments, weather radar system 202 can be a monopulse radar system, a sequential lobing system, or a radar system with an aperture capable of switching modes. Aircraft sensors 203 may include, for example, one or more lightning sensors, turbulence sensors, pressure sensors, optical systems (e.g., camera system, infrared system), outside air temperature sensors, winds at altitude sensors, INS G load (in-situ turbulence) sensors, barometric pressure sensors, humidity sensors, or any other aircraft sensors or sensing systems that may be used to monitor weather and detect, for example, lightning, convective cells, clear air turbulence, etc. Data from aircraft sensors 203 may be output to processor 204 for further processing and display, or for transmission to a station 220 (e.g., a ground-based weather radar system or terrestrial station) or to other aircraft 230, 240 via communication system 208. Data collected from ground-based radar systems, for example, terrestrial station 220 may also be processed by processor 204 to configure the collected data for display.

Weather radar system 202 may be a system for detecting weather patterns. Detected weather patterns may be communicated to electronic display system 206 for display to the flight crew. In addition, data from station 220 may be displayed on display system 206. Detected weather patterns may instead or may also be provided to electronics or processor 204 for further analysis or transmission to a station 220 or another aircraft 230, 240 via communication system 208.

Station 220 may direct the aircraft 201, 230, 240 via communication system 208 to scan in specific areas to improve detection accuracy of weather. Alternatively, system 202 may request that station 220 and aircraft 230, 240 direct a scan towards weather of interest to aircraft 201 (e.g., in the flight path) to improve weather detection accuracy and weather display accuracy. The scans performed by radar system 202 and the requests may be transmitted to station 220 or another aircraft 230, 240 via communication system 208.

Referring to FIG. 3, an exemplary aircraft communications system 300 is shown. System 300 may facilitate communications among an aircraft 301 having weather radar system 302 aboard, a ground-based data center or terrestrial station 320 and other aircraft, such as an aircraft 330 and an aircraft 340. Station 320 may receive weather data via a channel 342 from aircraft 301, via a channel 344 from aircraft 330, and via a channel 346 from aircraft 340. System 300 may utilize data and communications from more than three aircraft even though only three aircraft are shown in FIG. 3. Additional data may be received from ground based radar 350 from a wireless or wired channel. Station 320 may provide data to aircraft 301 via a channel 372, to aircraft 330 via channel 374, and to aircraft 340 via channel 376. Station 320 may also provide scheduling data and other control data to aircraft 301 via a channel 382, to aircraft 330 via a channel 384, and to aircraft 340 via a channel 386.

Various types of channels may be utilized including virtual channels, radio channels, satellite channels, etc. The channels may be bi-directional or uni-directional. Channels may be satellite link channels, VHF channels, INMARSAT channels, etc. Any type of wireless communications may be utilized. Various types of communication protocols, including network and ad hoc network protocols may be used to perform communication operations and establish the channels in FIG. 3.

The weather data exchanged among ground station 320 and aircraft 301, 330, and 340 may be in a number of forms. For example, the weather data may include radar data containing location information, motion vector data, time of sensing information, and measured parameter values for a weather condition 390. The location information may be in, for example, a format based on azimuth, elevation, and range from the radar system or another fixed reference point, in a rectangular grid format, a georegistered format, or other format. The radar data may also include radar characteristics associated with the radar used to provide the radar data. The characteristics may include an indication of band-type, radar quality, tilt angle, etc. In some embodiments, station 320 may adjust radar for its particular bands so that comparisons and selection of data is consistent.

In some embodiments, the weather data may be provided from a plurality of sources. Such weather data may also be indicative of one or more types of weather conditions. For example, weather data may be indicative of convective weather systems (e.g., thunderstorms), turbulence, winds aloft, icing, and/or volcanic ash. In some embodiments, data regarding convective weather systems may be provided from a ground-based weather system such as NEXRAD. Such data may include IDs for an adaptable number of weather cells, which may be segmented (e.g., delivered in polygon format) weather cells identified in a series of radar volume scans. Individual weather cells may be, for example, 3-D regions of significant reflectivity or other values above one or more specified threshold values. Individual weather cells may be composed of reflectivity radial run segments, and in turn, 2-D weather components composed of segment groups and occurring at different radar elevation angles. Weather components with calculated mass weighted centroids may be vertically correlated into a cell with an established centroid. Such weather cell data may also include individual data points and trends for each weather cell. For example, current weather cell location may be provided with azimuth, range, direction, and speed information, such as a motion vector using polar and/or Cartesian coordinates along with an estimate of any tracking errors. Other examples include storm base height, storm top height, maximum reflectivity, height of maximum reflectivity, probability of hail, probability of severe hail, cell-based vertically integrated liquid (VIL) content, enhanced echo tops (EET) and centroid height. Weather tracking data may be generated by monitoring movement of weather cells and matching cells in current and prior volume scans. Forecast data may be generated by predicting future centroid locations based on prior volume scans, and growth, decay, and/or shape change estimates. Average data for multiple weather cells may be provided as well (e.g., average motion vector data). The weather data may be provided as, for example, a table of alphanumeric values, and/or as a stand-alone display or graphical overlay.

In some embodiments, weather data indicative of weather conditions exhibiting intense convection may include lightning data such as that provided by the NLDN. Such data may include indications of individual discharges or flash rates in a given area. In some embodiments, pilot reports (PIREPs) may be used to indicate turbulence. In some embodiments, data from weather satellite systems, such as the Geostationary Operational Environmental Satellite system (GOES) and Polar Operational Environmental Satellite system (POES) may also be used (e.g., to track volcanic ash cloud behavior). In some embodiments, radiosonde data from weather balloons may be used. In some embodiments, data from satellite sources or nowcasting weather data sources (e.g., the Corridor Integrated Weather System (CIWS)) may be used.

Figure 4A:
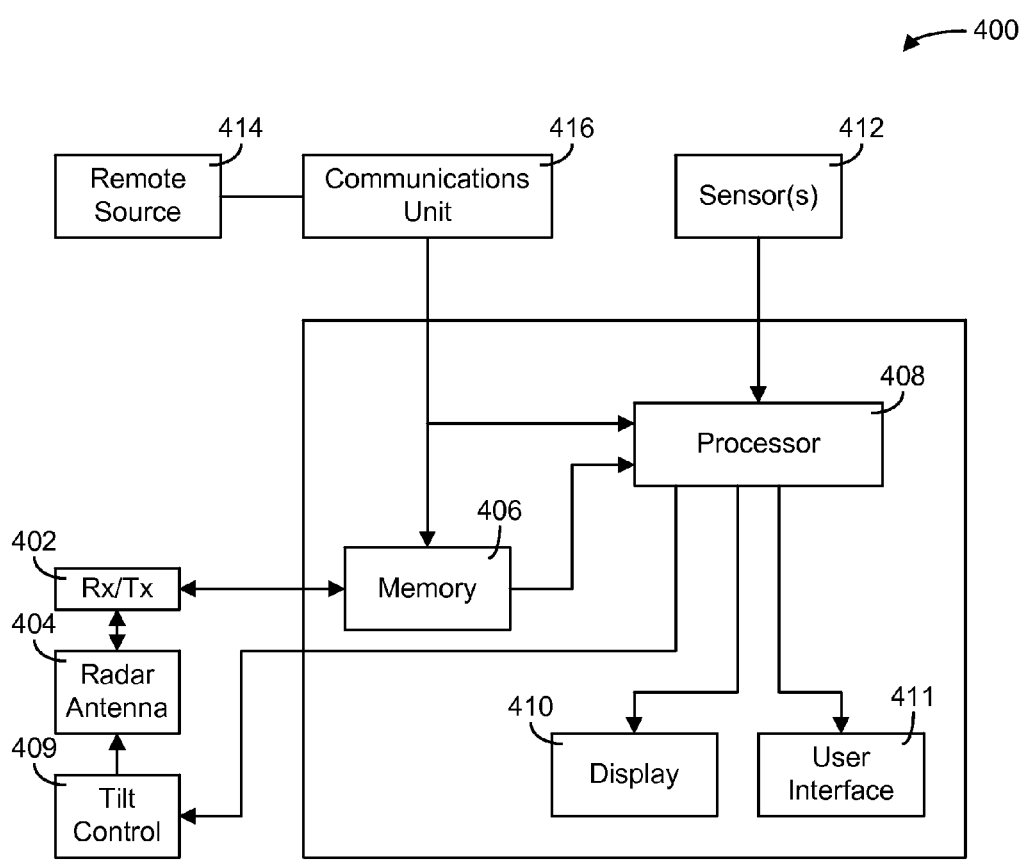
FIG. 4A is a block diagram of an exemplary weather radar system.

Referring to FIG. 4A, an exemplary weather radar system 400 is shown. System 400 may include a weather radar receiver/transmitter 402, weather radar adjustable antenna 404, a memory 406 (e.g., a multi-scan, multi-tilt angle memory), a processor 408 and a system bus that couples various system components including memory 406 to processor 408. System 400 may also include a tilt control 409 for automatically controlling the tilt angle (mechanical or electronic) of antenna 404. In some embodiments, this auto control may include an additional manual control feature as well. System 400 may also be in communication with one or more displays 410 (e.g., a display similar to display 20 shown in FIG. 1), one or more UI elements 411 (e.g., similar to UI elements 22 shown in FIG. 1) and one or more sensors 412, and also in communication with one or more remote data sources 414 (e.g., another aircraft or a ground station) via a communications unit 416 (e.g., radio or other wireless communication device).

Figure 4B:
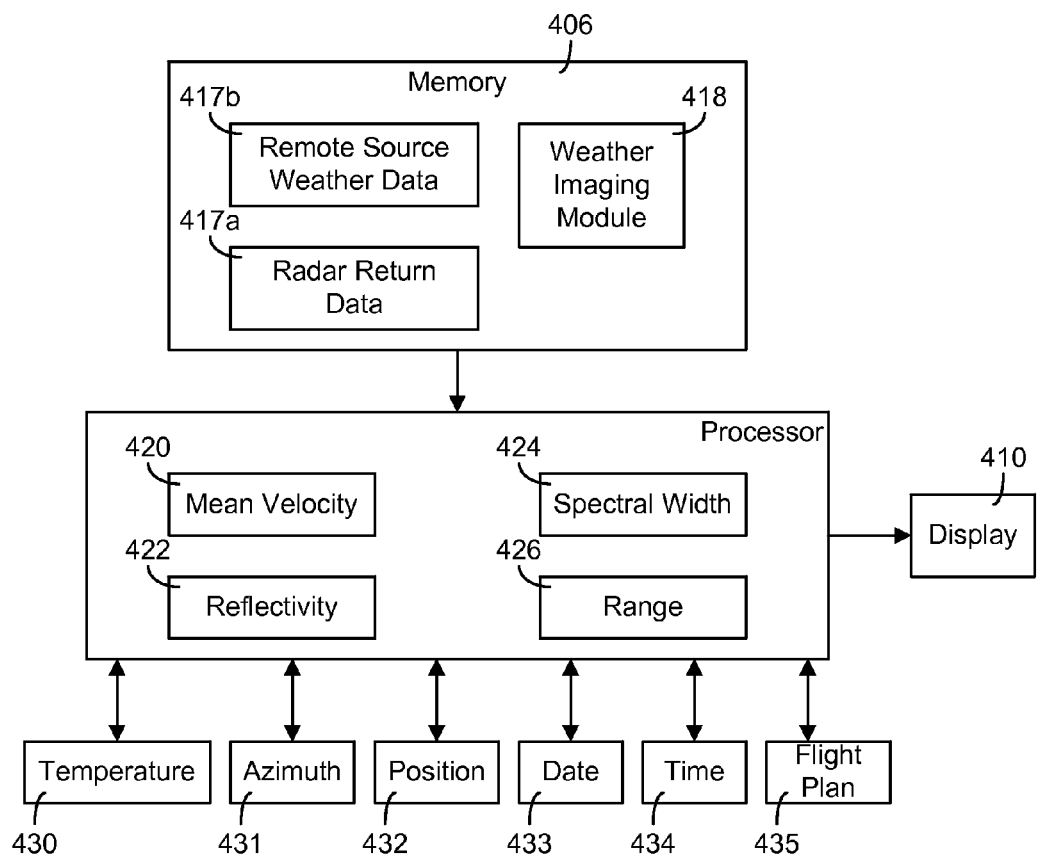
FIG. 4B is a data flow diagram of an exemplary weather radar system.

Memory 406 may include any type of machine-readable storage device capable of storing radar returns or associated weather data 417 (shown in FIG. 4B) or program instructions for analysis/processing by processor 408, such as weather image application 418 (shown in FIG. 4B). Memory 406 may be, for example, a non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise random access memory (RAM), read only memory (ROM), erasable programmable read only memory (EPROM), electrically erasable programmable memory (EEPROM), CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine. System 400 may have one or more memories 406 that use the same or a different memory technology. Memory 406 may store weather data 417 and weather image application 418 in addition to other instructions or data.

In some embodiments, memory 406 may be capable of storing in a readily addressable and rapidly retrievable manner at least two sets of weather data 417 resulting from two or more antenna sweeps at different angles, although a single scan of data may also be used in some embodiments. Memory 406 may also include a three-dimensional storage buffer for storing weather radar parameters according to X, Y and Z coordinates according to one embodiment. The storage of radar data and the form of the weather data 417 stored therein is not disclosed in a limiting fashion. A variety of techniques for storing weather data 417 may be used as well.

In some embodiments, weather data 417 may be stored as a mathematical equation representation of the information. The mathematical equation representation may be a piecewise linear function, piecewise nonlinear function, coefficients of a cubic spline, coefficients of a polynomial function, etc. that represent vertical representations of a weather condition based on scan data. The function may be an equation based on weather parameters that may be sensor driven, model driven, a merger of sensor and model, etc.

Processor 408 may be implemented in hardware, firmware, software, or any combination of these methods. System 400 may have one or more processors 408 that use the same or a different processing technology. Additionally, processor 408 may be a separate component of system 400 or may be embedded within another component of system 400. Processor 408 may execute instructions that may be written using one or more programming languages, scripting languages, assembly languages, etc. The instructions may be carried out by, for example, a special purpose computer, logic circuits, or hardware circuits. The term "execute" is the process of running an application or the carrying out of the operation called for by an instruction. Processor 106 may process data and/or execute applications stored in memory 406, such as weather data 417 and weather image application 418 and/or other instructions.

Processor 408 may be included as part of a single-scan, or multi-scan, multi-tilt angle weather radar system and may perform the customary functions performed by a conventional weather radar return processing unit. Processor 408 may also perform several additional operations based upon the additional data and/or instructions provided in memory 406. In general, processor 408 may merge or cross qualify portions, or ranges, of the radar returns of several different antenna sweeps at several different tilt angles, so that a single, relatively clutter-free image may be presented to the pilot based upon the several separate scans. The radar returns may be processed by processor 408 to generate a 2-D, 3-D, or 4-D weather profile of the weather condition. In some embodiments, processor 408 may merge or cross qualify portions, or ranges, of the radar returns or weather data of several different sources, including weather data from one or more remote sources 414, so that a composite or fused image may be presented to the pilot based upon the several weather data sources.

Processor 408 may process weather radar returns to identify or sense the presence of weather conditions in front of or in view of the aircraft. In some embodiments, processor 408 may utilize the altitude and range of the weather condition to generate a vertical profile associated with the weather. Processor 408 may scan across an array of azimuths to generate a 3-D weather profile of the weather condition, which may be stored for later presentation and/or displayed on display 410. In some embodiments, additional visual indicators other than the representation of weather are provided on display 410. In some embodiments, a range and bearing matrix having range markers indicating distance from a current location of the aircraft and bearing markers indicating azimuths from a current flight path or bearing of the aircraft may be provided and may assist the pilot in cognitive recognition of weather features from the pilot's perspective.

Referring now to FIG. 4B, a data flow diagram of exemplary weather radar system 400 is shown. As shown in FIG. 4B, processor 408 may provide a velocity parameter 420, such as a mean velocity parameter and a spectral width parameter 422 (e.g., derived from weather radar returns or from weather data from a remote source for individual or grouped weather cells). Alternatively, other types of velocity parameters can be utilized. In addition, processor 408 may provide a reflectivity parameter 424 and a range parameter 426. Range parameter 426 along with scan angle position may be used to plot the location of a weather condition on display 410. Processor 408 may also receive a temperature parameter 430, an azimuth 431, a location 432, a date 433, a time 434, and a flight plan 435 from another source, such as an external sensor or system. In some embodiments, parameters 430, 431, 432, 433, 434 and 435 may be computed by processor 408 using data stored in memory 406, such as radar return data 417a or remote source data 417b.

Weather data 417a from returns received by antenna 404 and weather data 417b from remote source 414 may be stored in memory 406. Weather data 417b from remote source 414 may be received via communications unit 416 (shown in FIG. 4A). Weather data 417 may, for example, be based on received horizontal and/or vertical radar scans and/or data from other sources 414 (e.g., NEXRAD weather data). Weather data 417 may also be from another weather radar source or data from an onboard weather radar system operating at a different frequency, such as a millimeter frequency, a Ka band frequency, a W band frequency, etc. In some embodiments, weather data 417 may be from a non-radar airborne source (a LIDAR source, an infrared source, etc.). Weather data 417 may include weather data as described with reference to FIG. 3 above. For example, weather data 417 may include a time of sensing data, such as a time stamp, and motion vector data (e.g., individual weather cell and average motion vector data) for temporal and spatial correlation (e.g., NEXRAD data received from remote source 414).

Referring again to FIG. 4A, memory 406 may store a weather imaging module 418 that may be executed by processor 408. Weather imaging module 418 may be, for example, one or more program modules including routines, programs, objects, components, data structures, etc. that perform particular tasks or implement particular abstract data types. Weather imaging module 418 may be written using, for example, one or more programming languages, assembly languages, scripting languages, etc. According to an exemplary embodiment, weather imaging module 418 may be an organized set of instructions that, when executed, cause processor 408 to utilize weather data 417a from returns received by antenna 404 and/or weather data 417b received from remote source 414 stored in memory 406 to provide individual, composite, fused, or overlay image data indicative of a weather condition for display on display 410. The image data derived from weather data 417a and 417b may be spatially correlated by weather imaging module 418 using, for example, time of sensing information and motion vector values. In some embodiments, growth and decay information may be received, which may be used by weather imaging module 418 to increase or decrease the size, shape, and intensity of an image or other visual indication of a weather condition displayed in accordance with time. In some embodiments, weather imaging module 418 may determine a confidence factor reflecting the degree to which weather data 417 received from two or more sources agree in their characterization of the weather condition.

Figure 5A:
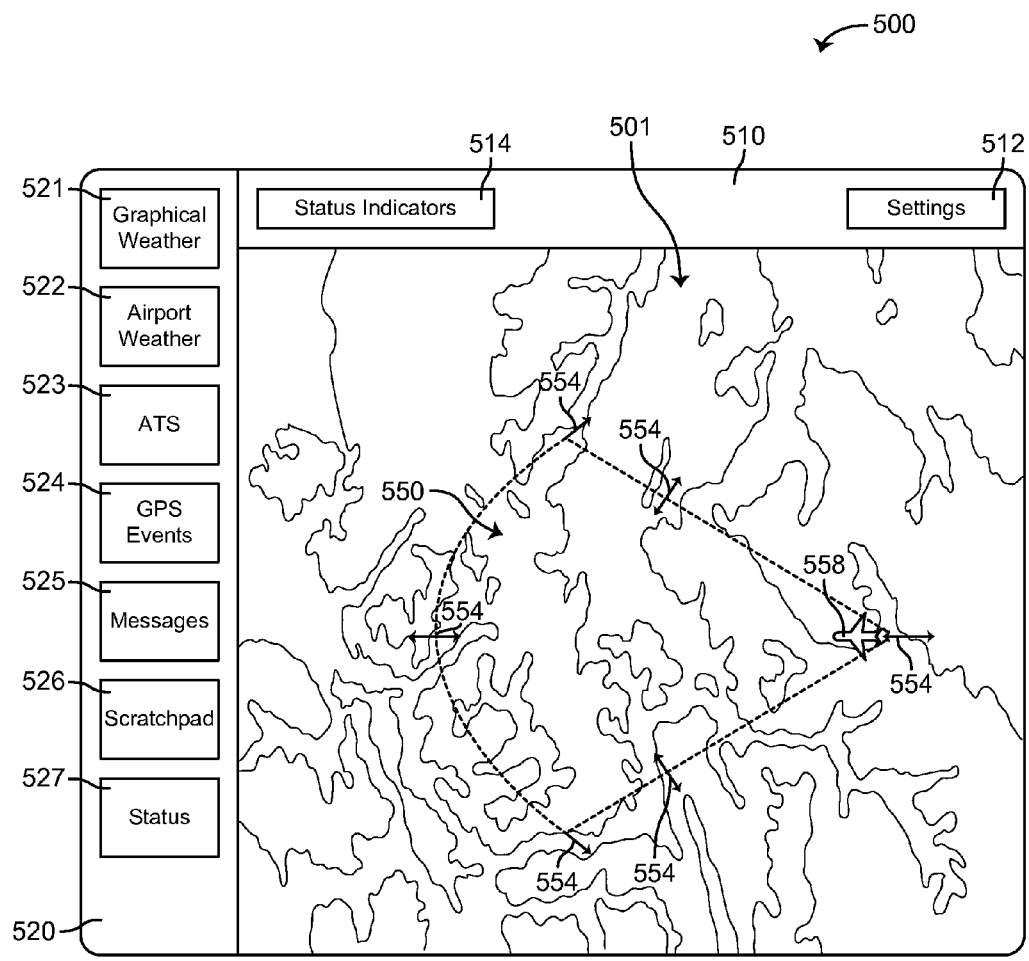
FIG. 5A is an illustration of a display screen for selectively displaying weather and aviation events according to one embodiment.
Figure 5B:
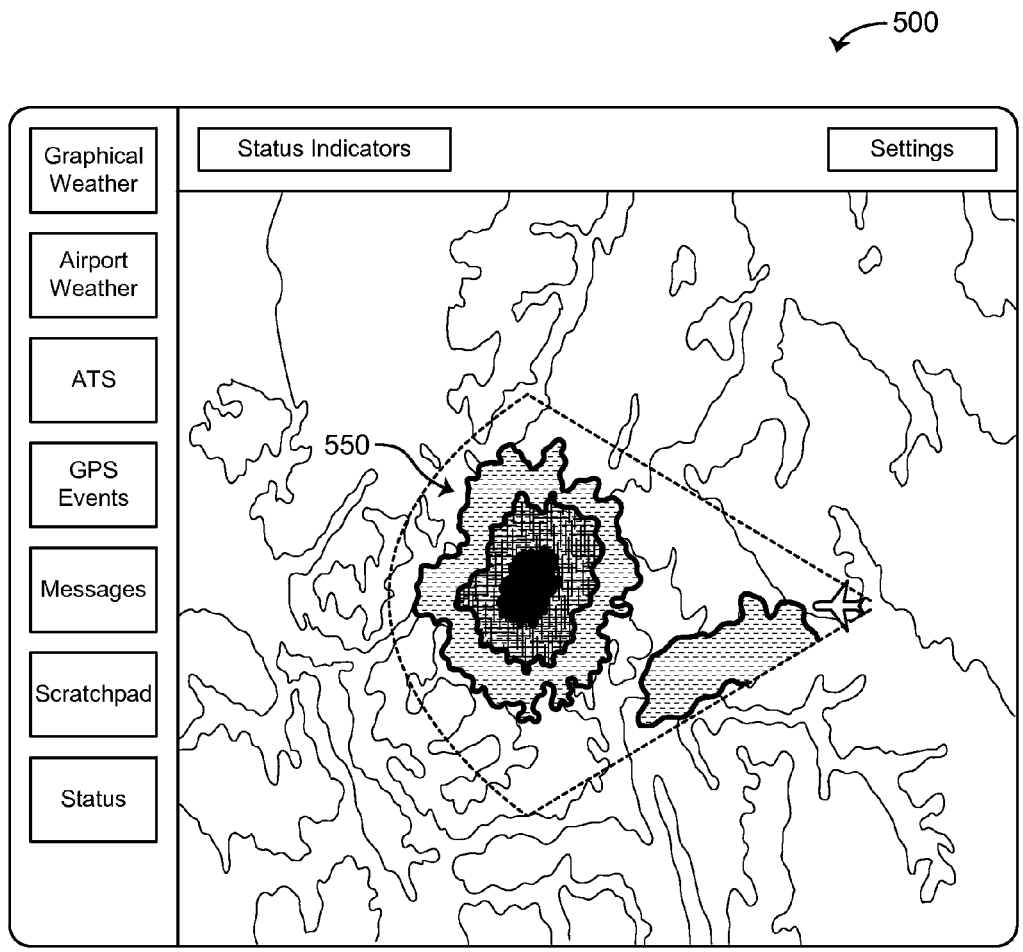
FIG. 5B is an illustration of a display screen for selectively displaying weather and aviation events according to another embodiment.
Figure 5C:
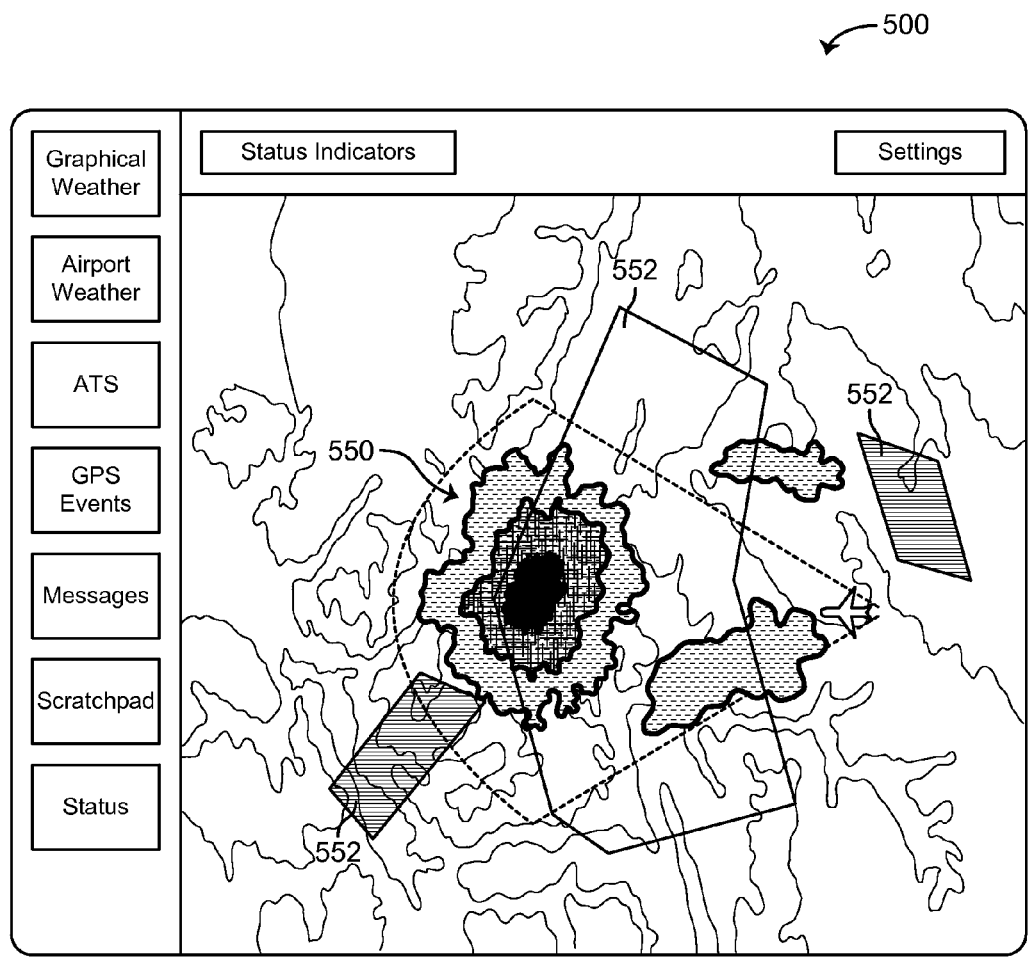
FIG. 5C is an illustration of a display screen for selectively displaying weather and aviation events according to yet another embodiment.

Referring now to FIGS. 5A-5C, illustrations of a display device for selectively displaying weather and aviation events are shown according to an exemplary embodiment. The display device of FIGS. 5A-5C may be, for example, in the form of program instructions that may be executed by a processor included in a weather radar system, such as exemplary weather radar system 400 shown in FIGS. 4A and 4B. The display device may display weather data received from one or more sources as described with reference to, for example, FIGS. 3, 4A, and 4B.

Referring now to FIG. 5A, the display device 500 includes a display screen 501 for selectively displaying weather and aviation events is shown according to one embodiment. The display screen 501 is configured to be displayed on an electronic display, such as a flight display 20 in aircraft control center 10. Display screen 501 may include information in various forms, for example, a display status bar 510 and a display option bar 520. The display status bar 510 and display option bar 520 may normally be hidden and displayed upon user configuration using UI elements 22, user configuration using display screen 501 (e.g., though a touch screen interface), or upon an alert or event occurring. For example, in one embodiment, display status bar 510 is normally hidden but is displayed along with an alert sound upon a severe weather report issuing from the National Weather Service.

The display device for selectively displaying weather and aviation events may also include further information options displayed on display status bar 510, such as a settings indicator 512 and status indicator 514. When selected, settings indicator 512 may provide a user with options to customize display screen 501. For example, a user may make selections regarding screen brightness, contrast, refresh rate, and color scheme, among other options. When selected, status indicator 514 may display information relating to the status of the weather display, including information relating to the connection between radar system 400 and remote source 414, connectivity alerts, and system maintenance information, among other status information. Other options may also be provided, for example, enabling the layering of aviation event data, the ability to turn various features "on" or "off" and an ability to request various graphical weather products. For example, in one embodiment, a user may have options to display different layers of information on the display screen, such as weather radar, Significant Meteorological Information ("SIGMETS"), Airmen's Meteorological Information ("AIRMETS"), Temporary Flight Restrictions ("TFRs"), volcanic ash warnings, forecasted winds and temperatures aloft, turbulence forecasts, flight route information, or icing data, among others.

Display screen 501 may also include a display option bar 520. In one embodiment, display option bar 520 includes a plurality of display options and communication features related to aircraft flight, navigation, and safety. For example, in one embodiment, a user may have options to display and/or request information regarding graphical weather 521, airport weather 522, airport terminal services ("ATS") 523, and GPS events 524, among others. A user may also have options to access and display other features as well, for example, messages 525 to communicate with other aircraft or ground-based systems, a scratchpad 526 for note taking, and status 527 indicators detailing, for example, flight information or forecasted weather, among other options as further described below.

In one embodiment, upon selecting graphical weather 521, the user is presented with various options relating to weather events. For example, in one embodiment, the user may be provided with a list of weather features or weather products to be displayed on display screen 501, such as storms, clouds, fog, areas of reduced visibility, wind shear, areas of high turbulence, lightning storms, and volcanic ash, among others. The user may select any number of weather products to be displayed. In the case where multiple features are selected, each feature may be labeled or displayed with identifying characteristics on display screen 501. In some cases, not all features will be available in certain geographic areas, in which case, a user of the display system will be notified which features are available and which features are not available.

In one embodiment, upon selecting airport weather 522, various options relating to weather events occurring at a specified airport are displayed. For example, weather events occurring at the departure airport, the destination airport, or other airports, including airports the aircraft may fly near to in route to the aircraft's destination, may be displayed. In one embodiment, upon selecting airport terminal services 523, various options relating to services provided at the terminal are displayed and requests can be communicated to airport personnel at the destination airport or to a third party. For example, in one embodiment, options are displayed relating to de-icing services, passenger services (e.g., check-in, ticketing, boarding, baggage handling, VIP staffing), ramp handling (e.g., aircraft loading and unloading, marshalling, pushback, fueling), aircraft cabin cleaning, cargo services, and fueling, among others.

In other embodiments, additional features may be displayed and available to aircraft crew, such as GPS events 524, messages 525, a scratchpad 526, and status 527. Using such features, aircraft crew may access information relating to other aircraft, send messages or otherwise communicate with other aircraft, airport personnel, government officials, or other ground-based system with communication capabilities, take notes or record reminders, or check the status of the current flight, weather forecasts, or onboard instruments. For example, the device may enable two-way communication between the cockpit and all services available on the ACARS network, including PreDeparture Clearance ("PDC"), Digital Airport Terminal Information Services ("D-ATIS"), weather products and a host of messaging destinations including email, SMS, group messaging, fax and aviation ground networking addresses (e.g., Aeronautical Fixed Telecommunications Network "AFTN" and ARINC Data Network Service "ADNS"), among others.

In one embodiment, the display screen 501 for selectively displaying aviation events includes a customizable display area 550 for displaying aviation events and weather data. As described in detail above, the display system may retrieve data from various data sources, such as an on-board radar system, other aircraft, or a ground-based radar system. Display area 550 is selected by aircraft crew by using UI elements 22 in cockpit 10 or through a touch-screen interface included on display screen 501, which may be any one or more of display screens 20. A user can select display area 550 by selecting and moving display points 554 in relation to aircraft position 558. The initial shape, direction and size of display area 550 mimics the forward looking radar on board the aircraft. In one embodiment, characteristics of display area 550 can be selectively customized by a user, such as the display area's width, length, location and orientation.

In one embodiment, display area 550 automatically changes position as the aircraft 558 changes position such that the display area 550 is repositioned in relation to the position of the aircraft. In this manner, the flight crew always has radar data for a minimum range. In some embodiments, display area 550 automatically adjusts to reflect the curvature of the earth. Display area 550 may be manipulated by aircraft crew before flight or during flight in cases where an updated display area 550 is desired, for example, in the event a sharp turn is required. In the event a sharp turn is foreseen before takeoff, aircraft crew may program the display area 550 to change at a predetermined time or location such that the display area 550 provides the flight crew with a larger field of view at the same time a maneuver is made.

In one embodiment, the aircraft's movement is tracked and displayed on the display screen 501 in relation to display area 550. For example, the flight crew may monitor the aircraft's position within the requested area and select a second display area once the aircraft is approaching the boundary of the first display area such that the second display area displays requested information before the aircraft flies beyond the first selected display area. In another embodiment, the display area 550 may automatically update based on the aircraft's location within a first display area. For example, the display system may be configured such that the aircraft always has at least three-hundred miles of forward-looking weather radar data. For example, upon flying two-hundred miles into a first display area with five-hundred miles of forward-looking weather data, the system may be set to automatically request a second display area of five-hundred miles of forward-looking weather data in the direction of the aircraft's current heading, regardless of the aircraft's original heading. In one embodiment, the selected display area 550 may be automatically updated based on time. For example, the system may be configured to update the display area every five minutes regardless of a change in the aircraft's location. In one embodiment, the display area 550 is updated based on weather detected by the ground station within the aircraft's vicinity. For example, in one embodiment, upon the ground station detecting a thunderstorm formation within two-hundred miles of the aircraft, the display area is automatically updated and the ground station transmits an updated image to the aircraft. The display area may be configured to automatically update based on other criteria as well, including radio transmissions, weather advisory warnings, and information received from SIGMETs, or AIRMETs, among others.

The display area 550 may be configured to display a default area. For example, in one embodiment, the display area's normal area is 300 nautical miles from the aircraft's current position. In another embodiment, display screen 501 may indicate the aircraft's intended flight path and display any actual deviations therefrom. Display area 550 may be indicated on display screen 501 by dashed lines, solid lines, shading, or other indicator that differentiates the selected display area 550 from non-selected areas. In one embodiment, previous selected areas 550 remain available and denote a time of receipt even after the aircraft has left the area. For example, previously received and displayed weather images in selected areas may remain on screen even after the plane has flown through such selected areas such that the flight crew is able to reference conditions previously traveled through. In one embodiment, selected area 550 is displayed along with products received from the ground station such that the flight crew may clearly identify and differentiate the selected area 550 from non-selected areas. For example, the selected area 550 may be separated from non-selected areas using dashed lines, solid lines, area shading, or other indication. The selected area may be included in the image returned from the ground station or be merged with the image returned from the ground station when displayed. For example, upon selecting an area to display weather radar and transmitting the request to the ground station, the ground station transmits an image containing weather radar data and a shaded region defining the selected area. In some instances, when no weather data is displayed on display 501 (e.g., during a clear sky), displaying the selected area 550 with no weather data contained therein provides flight crew with an indication that data for the selected area 550 was successfully received and that the lack of weather data displayed in the selected area 550 is due to the sky being clear. In some embodiments, in addition to or in place of displaying an empty selected area, an indicator may be displayed signaling a clear sky. For example, upon receiving weather data relating to a clear sky, the selected area may be displayed along with a message reading "Clear Sky" or "All Clear". Advantageously, differentiating the selected area from non-selected areas prevents flight crew from mistaking an empty display area in which no data was returned from the ground station for an area with no weather data indicating a clear sky.

The selected display area 550 is communicated to ground servers, for example, terrestrial station 320 (otherwise referred to as "ground station"), along with the requested weather features and other available products. The ground station geo-spatially determines the weather features and other available products that are available in the selected area 550, those that are partially available in and extend beyond the selected area 550, and those that are only available beyond the selected area 550. After evaluating whether simplification of the images is required and whether product information extends beyond selected area 550, the ground station transmits the requested data back to the aircraft as compressed vector graphics. In one embodiment, at least all of the requested data that is available in the selected area 550 is transmitted back to the aircraft (e.g., via channel 372 or channel 382). For example, as shown in FIG. 5B, in one embodiment only the requested data that is available in the selected area 550 is transmitted back to the aircraft and displayed. Data that is partially available in and extends beyond the selected area 550 may also be transmitted back to the aircraft and displayed in addition to data that is entirely outside of the selected area if selected to do so by flight crew or if the display system determines the data should still be displayed. In some instances, the decision to display data beyond selected area 550 is made by the ground station based on the ground station determining whether the data is relevant to the aircraft's flight path. For example, as shown in FIG. 5C, weather and other aviation products are displayed beyond selected area 550 based on the ground station's determination that the displayed products are relevant to the aircraft's current flight path and any near-future deviations made therefrom.

In some embodiments, data may be displayed as a non-detailed overlay 552. Overlays 552 that extend beyond selected area 550 are clearly identified so that flight crew will not overlook or miss a significant event displayed in a product outside of the selected area. In some embodiments, the overlays 552 displayed on display screen 501 may be selected by a user of the display system in order to display more information regarding the overlay, as discussed further below. In some embodiments, flight crew may select various aviation products to be displayed as overlays 552 on display screen 501. Many types of aviation products can be selected and displayed as an overlay. For example, data may be received and displayed relating to weather radar, turbulence, icing, wind shear, volcanic ash, dust, sand, winds aloft, restricted area items (e.g., temporary flight restrictions), flight routes (including common trans-Atlantic routes such as the North Atlantic Tracks), AIRMETs (including AIRMET Sierra, Tango and Zulu relating to mountain obscuration/visibility, turbulence, and icing respectively), and SIGMETs. In some embodiments, the ground station may determine that overlays 552 relating to certain products should be displayed even when the products are not selected to be displayed by the flight crew. For example, in response to flight crew selecting to receive data relating to weather radar and turbulence, the system may display the selected products as well as include an overlay relating to icing data based on a determination that severe icing is forecasted in or near the selected area. Advantageously, receiving overlays relating to non-selected products provides flight crew with pertinent information even when serious weather events are overlooked or ignored.

In some embodiments, weather data may be mapped to a common reference frame. In some embodiments, the received weather data may be mapped to a common gridded format using, for example, a 1 kilometer grid. Such a grid may provide a uniform structure in latitude and longitude to which one or more sets of weather data from one or more sources may be mapped. Other formats and grid spacings are contemplated as well, depending on required detail, available memory, and processing capabilities. In some embodiments, weather data received in a non-gridded format (e.g., weather cell tracking data, lightning flash data, etc.) may be linked to the common gridded format.

In some embodiments, weather data for a weather condition may be received from multiple unsynchronized sources (e.g., multiple NEXRAD radar installations). For example, an aircraft having an aircraft-based weather radar system and receiving weather data from a ground-based weather radar system may be moving from the radar coverage area of one ground-based system to another ground-based system. In such embodiments, the location of a weather condition may be advected using weather data from whichever data source provides the best tracking geometry. For example, the respective range of each of the weather data sources may be used to determine which source may provide the best source of data for advection (e.g., azimuth resolution may deteriorate with increasing distance, data near a data source may be limited due to a low maximum radar elevation range, etc.). In some embodiments, an estimated motion vector may be calculated using data from one or more or all of the available data sources within range of the weather condition. In some embodiments, multilateration may be applied to range data received from each of the weather data sources rather than using motion vector data in order to avoid azimuth resolution issues. In some embodiments, the volume coverage pattern, altitude, range, and age of the weather data for each weather data source may be used to estimate a number of radar slices or beams in order to determine the quality of the weather data from each source.

Terrestrial station 320 may send images to the aircraft in vector image format, thereby providing higher quality graphics on display 20 and display screen 501. Metadata may also be added to vector images, thereby providing more information to the aircraft. In one embodiment, flight crew may interact with displayed aviation products via the touch-screen display to display more information. For example, upon flight crew selecting a wind shear overlay on the display screen, additional information may be displayed, such as the direction of the wind shear, areas of highest danger, and the speed of the wind shear, among others. Advantageously, transmitting images in vector format may, in some cases, reduce the size of the image file while providing more accurate and higher quality images to display 20.

In some cases, before terrestrial station 320 sends images to the aircraft, algorithms are used to reduce image file sizes. For example, if a particularly large display area is selected that covers a large storm system, various algorithms may be used to reduce the image file sizes before the images are transmitted to the aircraft. In the event image files for various products are separately transmitted to the aircraft, or transmitted files are of varying resolutions, the display device merges the image products such that the images are displayed together. Previously received data from different requests may also be merged based on the timestamp associated with the previously received data. In some embodiments, the display device may be configured to animate weather patterns over time based on timestamps associated with a series of received images. Advantageously, transmitting compressed vector images for selected areas instead of entire regions enables the ground station to reliably transmit high-quality images using low bandwith transmissions.

The embodiments in the present disclosure have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system.

As noted above, embodiments within the scope of the present invention include program products comprising non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments in the present disclosure have been described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments in the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments in the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include one or more computers including a processor, a system memory or database, and a system bus that couples various system components including the system memory to the processor. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. User interfaces, as described herein, may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the disclosure. Likewise, software and web implementations of the present invention could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

Throughout the specification, numerous advantages of the exemplary embodiments have been identified. It will be understood, of course, that it is possible to employ the teachings herein without necessarily achieving the same advantages. Additionally, although many features have been described in the context of a particular data processor, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The disclosed subject matter is not limited to a particular embodiment, but extends to various modifications, combinations, and permutations that nevertheless fall within the scope and spirit of the appended claims.

What is claimed is:

1. A method of selectively displaying an image representative of a weather condition in relation to an aircraft, the method comprising:
    selecting, on a display screen, a display area to display weather data based on the location of the aircraft;
    selecting a weather condition to display in the display area from among a plurality of potential weather conditions;
    transmitting to an external weather data source the selected display area and the selected weather condition;
    determining, at the external weather data source, that a weather condition from among the plurality of potential weather conditions is detected outside the selected display area and that the weather condition detected outside the selected display area is relevant to the aircraft based on a flight path of the aircraft and a severity of the weather condition detected outside the selected display area;
    receiving, from the external weather data source, weather data representative of the selected weather condition for the selected display area and representative of the weather condition detected outside the selected display area and determined to be relevant to the aircraft, the weather data including location data for the weather conditions; and
    displaying the image representative of the selected weather condition within the selected display area and the weather condition determined to be relevant to the aircraft outside the selected display area, the image based on the received weather data.

2. The method of claim 1, wherein the selected display area is resized, reshaped, or reoriented during flight of the aircraft.

3. The method of claim 1, wherein the selected display area automatically relocates based on movement of the aircraft.

4. The method of claim 1, wherein the weather data is received in vector image format.

5. The method of claim 1, wherein multiple images based on received weather data are merged into a single image prior to the single image being displayed.

6. The method of claim 1, further comprising determining if any aviation event data should be displayed based on the location of the aircraft.

7. The method of claim 1, wherein the external weather data source is a ground-based radar system.

8. The method of claim 1, further comprising the displayed image separately identifying the selected display area and the area outside the selected display area.

9. The method of claim 1, further comprising automatically receiving and displaying updated weather data from the external weather data source based on weather detected near the aircraft by an onboard weather radar system or the external weather data source.

10. An aircraft weather radar system, comprising:
    a processor;
    a display; and
    memory coupled to the processor and containing program instructions that, when executed, cause the processor to:
        select a display area to display weather data based on the location of an aircraft;
        select a weather condition to display within the selected display area from among a plurality of potential weather conditions;
        determine that a weather condition from among the plurality of potential weather conditions is detected outside the selected display area and that the weather condition detected outside the selected display area is relevant to the aircraft based on a flight path of the aircraft and a severity of the weather condition detected outside the selected display area;
        receive, from an external weather data source, weather data representative of the selected weather condition for the selected display area and representative of the weather condition detected outside the selected display area and determined to be relevant to the aircraft, the weather data including location data for the weather conditions; and
        display an image representative of the selected weather condition within the selected display area and the weather condition determined to be relevant to the aircraft outside the selected display area, the image based on the received weather data.

11. The aircraft weather radar system of claim 10, wherein the selected display area is configured to be resized, reshaped, or reoriented during flight of the aircraft.

12. The aircraft weather radar system of claim 10, wherein the selected display area is configured to automatically relocate based on movement of the aircraft.

13. The aircraft weather radar system of claim 10, wherein the weather data is received in vector image format.

14. The aircraft weather radar system of claim 10, wherein the processor is configured to merge multiple images based on received weather data into a single image prior to displaying the single image.

15. The aircraft weather radar system of claim 10, wherein aviation event data is displayed based on the processor determining if the aviation event data should be displayed based on the location of the aircraft.

16. The aircraft weather radar system of claim 10, wherein the external weather data source is a ground-based radar system.

17. The aircraft weather radar system of claim 10, wherein the displayed image separately identifies the selected display area and the area outside the selected display area.

18. The aircraft weather radar system of claim 10, wherein updated weather data is automatically received from the external weather data source and displayed based on weather detected near the aircraft by an onboard weather radar system or the external weather data source.

19. An aircraft weather radar system, comprising:
    a processor;
    a display; and
    memory coupled to the processor and containing program instructions that, when executed, cause the processor to:

transmit to an external weather data source a selected display area to display weather products, the weather products selected from a plurality of available weather products offered by the external weather data source;

receive weather data from the external weather data source, including weather data representative of the selected weather products for the selected display area and weather data for the selected weather products available outside the selected display area, the weather data including location data for the weather products; and display the selected weather products in the selected display area and display the selected weather products available outside the selected display area, wherein the weather products displayed in the selected display area are separately identified from the weather products displayed outside the selected display area, and wherein the selected display area automatically and simultaneously changes location based on movement of the aircraft.

20. The aircraft weather radar system of claim 19, wherein the weather data is received in vector image format.

21. The aircraft weather radar system of claim 19, wherein the processor is configured to merge multiple images based on received weather data into a single image prior to displaying the single image.

22. The aircraft weather radar system of claim 19, the processor further configured to select a second display area to display the selected weather products.

23. The aircraft weather radar system of claim 22, wherein the second display area does not change location based on the movement of the aircraft.

24. The aircraft weather radar system of claim 23, wherein the second display area changes location based on the movement of a selected weather product.

25. The aircraft weather radar system of claim 19, wherein updated weather data is automatically received from the external weather data source and displayed based on weather detected near the aircraft by an onboard weather radar system or the external weather data source.

* * * * *